United States Patent [19]

Harris et al.

[11] Patent Number: 5,045,220
[45] Date of Patent: Sep. 3, 1991

[54] INCREASING THE VISCOSITY OF $CO_2$ SOLUTIONS

[75] Inventors: Thomas V. Harris, Benicia; Cyrus A. Irani, Hacienda Heights, both of Calif.; Wayne R. Pretzer, Wheaton, Ill.

[73] Assignee: Chevron Research Company, San Francisco, Calif.

[21] Appl. No.: 444,188

[22] Filed: Nov. 30, 1989

Related U.S. Application Data

[60] Division of Ser. No. 73,791, Jul. 14, 1987, Pat. No. 4,913,235, which is a continuation-in-part of Ser. No. 58,690, Jun. 3, 1987, abandoned, which is a continuation of Ser. No. 910,041, Sep. 22, 1986, abandoned, which is a continuation of Ser. No. 749,479, Jun. 27, 1985, abandoned.

[51] Int. Cl.$^5$ ............................................. E21B 43/22
[52] U.S. Cl. ................................... 252/8.554; 252/364
[58] Field of Search ...................... 252/8.554, 307, 306, 252/364

[56] References Cited

U.S. PATENT DOCUMENTS 3,703,486 11/1972 Keil .................. 260/2.5 AA
4,404,112 9/1983 Scherubel et al. ........... 252/8.551 X
4,609,043 9/1986 Cullick .................. 252/8.554 X
4,913,235 4/1990 Harris et al. .................. 166/273

Primary Examiner—Robert L. Stoll
Assistant Examiner—Gary L. Geist
Attorney, Agent, or Firm—E. A. Schaal; E. J. Keeling

[57] ABSTRACT

A method of increasing the viscosity of $CO_2$ at least three-fold by adding (1) a viscosifying amount of a polymer having a Minimum Solubility Parameter of 6.85 or less and a plurality of electron donor atoms selected from the group consisting of O, N, and S, and (2) a sufficient amount of a cosolvent to form a one-phase solution, said cosolvent being capable of (a) dissolving at least 2% by weight of $CO_2$ at 25° C. and 900 psig, and (b) forming a one-phase mixture with the polymer when the mixture contains 10 weight percent cosolvent at ambient temperature and a pressure sufficient to maintain the cosolvent in the liquid phase. New compositions containing $CO_2$, the defined polymer and cosolvent are also claimed as is a method for recovering oil from underground formations using a viscosified $CO_2$.

20 Claims, 8 Drawing Sheets

INCREASING THE VISCOSITY OF CO₂ SOLUTIONS

This is a divisional of U.S. application Ser. No. 073,791, filed July 14, 1987 now U.S. Pat. No. 4,913,235, which is a continuation-in-part of application Ser. No. 058,690, filed June 3, 1987 and now abandoned, which in turn is a continuation of Ser. No. 910,041, filed Sept. 22, 1986 and now abandoned, which in turn is a continuation of Ser. No. 749,479, filed June 27, 1985 and now abandoned.

BACKGROUND OF THE INVENTION

1. Field of the Invention.

This invention relates to a method of increasing the viscosity of carbon dioxide; to new compositions of matter comprising carbon dioxide and a viscosifying amount of a defined polymer-cosolvent mixture; and to a method of recovering oil from underground subterranean formations.

In newly discovered oil fields, oil will usually be recovered by flowing from a producing well under the natural pressure of the fluids present in the porous reservoir rocks. The naturally occurring pressure in the formation decreases as the fluids are removed. This is the so-called primary production and recovers perhaps 5% to 20% of the oil present in the formation.

Secondary recovery methods are used to recover more of the oil, and in these methods a fluid is injected into the reservoir to drive additional oil out of the rocks, e.g., waterflooding. Waterflooding, of course, has its own limitations as it is immiscible with oil and as the water displaces the oil, oil remaining in the reservoir reaches a limiting value known as "the residual oil saturation" and oil no longer flows. There is a strong capillary action which tends to hold the oil in the interstices of the rocks. The amount of oil recovered by secondary techniques is usually from about 5% to 30% of the oil initially present.

In recent years, more attention has been directed to the so-called enhanced recovery or tertiary recovery techniques. While these methods are more expensive, they are justified by the increased price of crude. In general, these tertiary recovery methods are used to recover the residual oil by overcoming the capillary forces which trap oil during waterflooding. For example, it has been suggested to add surfactants to the flood to decrease the interfacial tension and thus allow oil droplets to move to producing wells.

Secondary recovery of oil is also possible by the miscible fluid displacement process. Propane, for example, would be an appropriate material to utilize for it is fully miscible with oil but, in general, propane is far too expensive, except in remote regions such as the Arctic where it is impractical to pipe propane and thus any propane produced in the field could be reinjected to recover more liquid hydrocarbons.

Nevertheless, the use of crude oil miscible solvents such as propane to displace crude oil through a formation is well known, as, for example, in the teachings of Morse in U.S. Pat. No. 3,354,953. It is also suggested by Morse that the viscosity of the propane can be "controlled" (i.e., increased) by the addition of kerosene. Henderson et al. teach in U.S. Pat. No. 3,330,345 to use a slug of thickened material such as propane before flooding with an amphipathic solvent. The teachings of Dauben et al. in U.S. Pat. No. 3,570,601 relate to the recovery of oil using viscous propane, where the propane is viscosified by first dissolving a solid polymer such as polyisobutylene in a heavier hydrocarbon, such as heptane, and then diluting this first solution with propane to form the oil-driving bank.

In the continental United States, carbon dioxide is generally less expensive. A number of carbon dioxide floods have been tried in the United States. The $CO_2$ tends to dissolve in the oil which swells with a consequent decrease in viscosity and improvement in the flow to producing wells. The $CO_2$ also extracts light hydrocarbons from the oil and this mixture of $CO_2$ and light hydrocarbons can in some cases reach a composition that will miscibly displace the oil. This $CO_2$-rich phase characteristically has a lower viscosity than the oil and tends to finger through the formation. Early $CO_2$ breakthrough is of course not desired since reservoir sweep is reduced and, also, expensive separation procedures are required to separate and recycle the carbon dioxide. For example, the viscosity of carbon dioxide at usual reservoir pressures and temperatures is on the order of a few hundredths of a centipoise while the oil being displaced may have a viscosity in the range of from 0.1 to 100 centipoises.

It is apparent that an increase in viscosity of carbon dioxide would be helpful in decreasing the mobility of the carbon dioxide and thus increasing the pressure gradient behind the frontal region which would reduce fingering and improve the reservoir sweep.

2. Descriptive of the Prior Art

The prior art describes a number of techniques to control the mobility of carbon dioxide These techniques are described generally in an article entitled "$CO_2$ as Solvent for Oil Recovery" by F. M. Orr, Jr. et al. (Chemtech, August 1983, page 42, et seq.). There is the water-alternating-with-gas process where slugs of carbon dioxide are injected alternatively with slugs of water. Also, investigations have been made into the use of polymers to reduce the mobility of carbon dioxide. F. M. Orr, Jr. et al. report in the above article that studies by New Mexico Petroleum Recovery Research Center indicate that only low-molecular weight polymers dissolve in carbon dioxide and, as a result, only 10% to 20% increase in solution viscosity have been observed.

Other studies of the use of polymers for $CO_2$ thickening appear in "Measuring Solubility of Polymers in Dense $CO_2$" by J. P. Heller et al. (Polymer Preprint, Vol. 22(2), 1981, New York ACS Meeting) and especially "Direct Thickeners for Mobility Control of $CO_2$ Floods" by J. P. Heller et al. (SPE 11789, June 1983). In the latter paper, Heller et al. conclude that the search for polymeric direct thickeners has been "unsuccessful in the purpose by a wide margin." The increase in viscosity observed by Heller et al. was small and in no case greater than 30%, i.e., the ratio of the kinematic viscosity of the $CO_2$-polymer solution to the kinematic viscosity of the $CO_2$ under the same conditions was no greater than 1.3.

Recent work by J. P. Heller and J. J. Taber has been reported in "Development of Mobility Control Methods to Improve Oil Recovery by $CO_2$: Final Report," DOE/MC/10689-17 (available from NTIS) where the authors list some 53 polymers which have been tried in an effort to thicken the $CO_2$ but with little to no success.

Work done by Heller et al. was done with pure dry $CO_2$ at pressure of 1500 to 3160 psig and temperatures of 25 to 58° C. which would be typical of reservoirs where $CO_2$ flooding could be carried out. A number of low and high molecular weight polymers were tried, and in general their results showed that high molecular weight polymers were not soluble Polymers having solubilities above one weight percent (i.e., polybutene, polydecene and polypropylene glycol) all had molecular weights of 400 to 1000. Increasing molecular weight of the polymer led to decreased solubility of the polymer in $CO_2$. Heller's work suggests that it is not obvious how to find polymers having a molecular weight over 1000 that have any significant solubility in $CO_2$. It is also difficult and unobvious from the teachings of the prior art on how to substantially increase the viscosity by dissolving very high molecular weight polymers at desirably low concentrations of the polymers. The known poor solvent properties of liquid and supercritical $CO_2$ compared to the more usual solvents are a limiting factor when it comes to dissolving large molecules such as high molecular weight polymers.

It remains, therefore, a desired objective to find a means to increase the viscosity of carbon dioxide to achieve a viscosity of at least 0.15 centipoises utilizing polymers having a molecular weight above 1000. It has now been found that this objective can be achieved and that viscosity increases for the $CO_2$ of three-fold to 30-fold or more can be achieved utilizing certain defined cosolvents along with certain defined polymers

Figure 1:
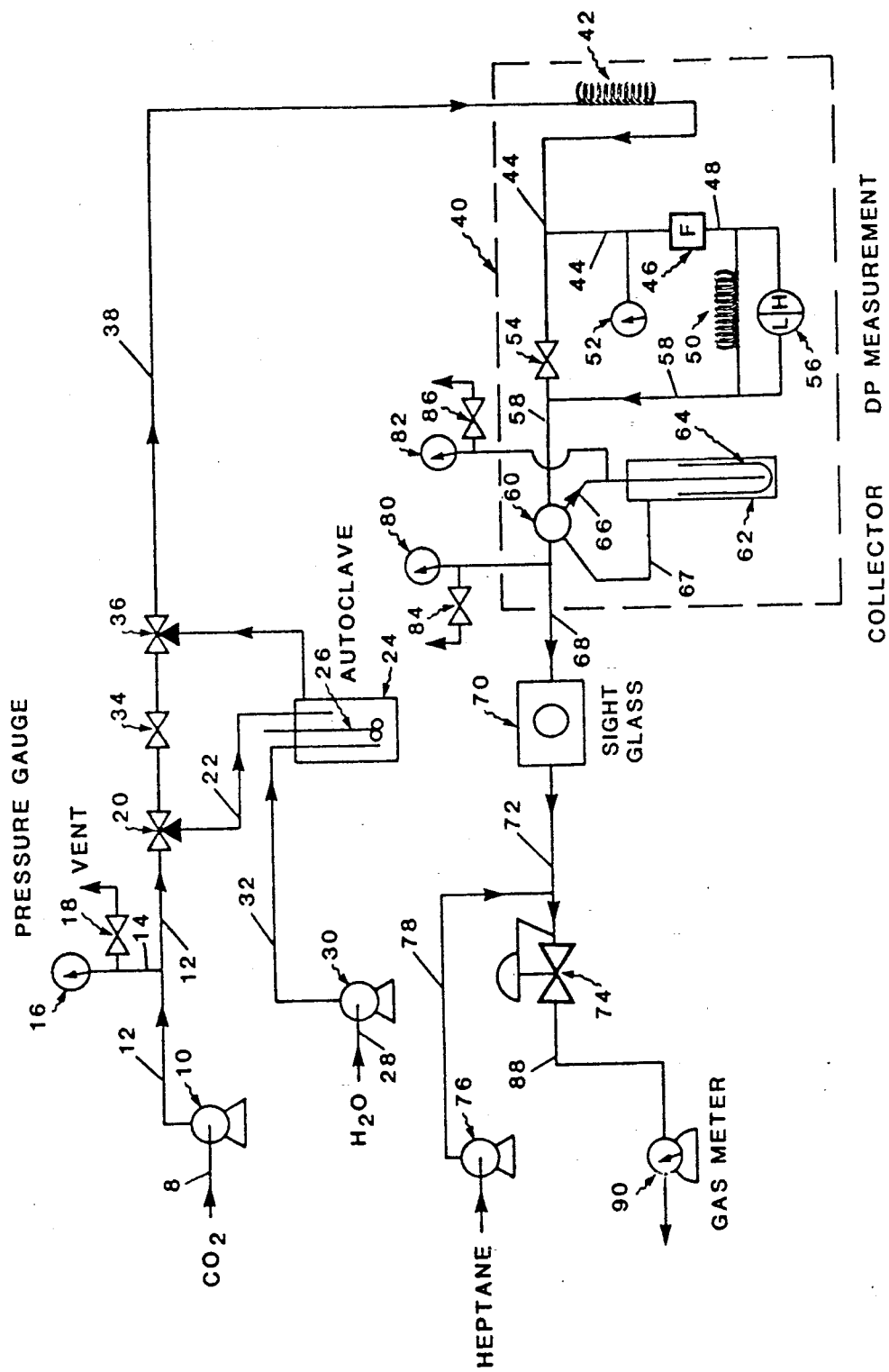
FIG. 1 is a schematic illustration of apparatus designed for measurement of $CO_2$/polymer solubility and viscosity.

4. Description of the Invention;

In accordance with the invention, a method for increasing the viscosity of $CO_2$ at least three-fold has been discovered which comprises admixing with the carbon dioxide a blend of a polymer having a molecular weight over 1000 and a cosolvent for such polymer and carbon dioxide. The preferred polymer is characterized as follows:

(1) it has a Minimum Solubility parameter of about 6.85 $(cal/cc)^{\frac{1}{2}}$ or less; and
(2) it contains a plurality of electron donor atoms selected from the class consisting of O, N, and S.

The cosolvent is characterized by (1) its ability to be dissolved in $CO_2$ at 25° C. and about 950 psig to at least the two weight percent level, and (2) its ability to form a one-phase admixture with the polymer at ambient temperature and a pressure sufficient to maintain the cosolvent in the liquid phase and wherein the weight of cosolvent is 10% by weight of the polymer. The amount of the polymer to employ is sufficient to achieve the desired increase in viscosity for the carbon dioxide. By utilizing the polymer - cosolvent blends of this invention, viscosity increases of the carbon dioxide of at least three-fold can easily be achieved and viscosity increases of 20- to 3-fold or more have been observed. The amount of the cosolvent to employ in combination with the polymer must be at least about 40 weight percent of the weight of polymer employed.

In one preferred embodiment of this invention, a blend of the polymer and the cosolvent is prepared to form a first solution. This first solution is then diluted with $CO_2$ to form an oil-driving injectable viscous $CO_2$ fluid which has a viscosity at least three times the viscosity of $CO_2$ at the desired reservoir conditions. The advantage of the use of the viscous $CO_2$ fluid is an improved sweep during flooding operations because of improved $CO_2$ mobility control with a consequent reduction of fingering.

Carbon dioxide has been used as an oil recovery agent wherein recovery is improved by taking advantage of the solubility of the carbon dioxide in the oil, causing viscosity reduction and swelling of the oil, thereby leading to increased recovery. In this use, carbon dioxide is not a miscible-type displacing agent since the pressures have been much lower than the minimum miscibility pressures for carbon dioxide and oil. The viscous $CO_2$ mixtures of this invention can be used in any $CO_2$ flood or drive process, but it is preferred that the formation pressure be sufficient to at least equal the minimum miscibility pressure for the carbon dioxide in the oil. The upper limit of pressure is the fracture pressure of the formation. The precise pressure needed in order to achieve miscibility conditions can be determined by anyone having ordinary skill in the art. Such minimum miscibility pressures are generally on the order of 1100 psig or more.

A typical process in which carbon dioxide is driven through the reservoir by an aqueous fluid is fully described in U.S. Pat. No. 3,065,790 to Holm.

Holm et al. in the paper entitled "Mechanism of Oil Displacement by Carbon Dioxide," *Journal of Petroleum Technology, December* 1974, pp. 1427–1438, demonstrate the advantage of maintaining carbon dioxide at a pressure above the pressure required for miscible-displacement of the reservoir oil by carbon dioxide. This "miscible-displacement pressure" depends on the hydrocarbon type, formation temperature, and other formation conditions, but is generally between about 1100 and 3000 psi. The studies of Holm et al. demonstrate that no advantage is obtained for maintaining formation pressures higher than just above the miscible-displacement pressure. At the high pressures existing in underground formations, carbon dioxide exists as a dense fluid or liquid rather than as a gas, with the critical temperature of carbon dioxide being about 88° F. That is, carbon dioxide cannot be liquefied at temperatures above about 88° F. regardless of the pressures applied but can be compressed to the state of a dense fluid. However, below 88° F. carbon dioxide exists either as a gas or a liquid depending upon the pressure applied. The typical pressures employed in enhanced oil recovery when carbon dioxide is used are in excess of about 700 psi and the temperatures are below about 250° F. Under these conditions the carbon dioxide exists as a dense fluid, rather than as a gas, and if the reservoir temperature is below about 88° F. the carbon dioxide exists as a liquid.

The amount of carbon dioxide injected into the formation will, as is known, vary for different formations and will be dependent upon total reservoir pore volume, hydrocarbon pore volume, and other unique formation characteristics. In carrying out the process of this invention, a slug of viscous $CO_2$ having a reservoir pore volume of between about 0.001 to about 2.0 can suitably be employed with acceptable results being obtained with from about 0.02 to about 0.35 pore volume slugs. The viscous carbon dioxide dense fluid can be used alone to displace the oil in the formation or, preferably, one or more slugs containing 0.01 to about 1 pore volume of the carbon dioxide dense fluid are driven through the formation by a drive fluid. The drive fluid may be water, brine, carbonated water or gas sufficient in quantity to drive the viscous $CO_2$ through the reservoir from the injection well to a production well.

The term "injection pressure" as used in this specification is meant to define the pressure at which the displacement fluids enter the formation, i.e., the pressure at a point in the well bore adjacent to the formation. The pressure at which the viscous $CO_2$ fluid is injected into the well bore is generally greater than the pressure in the formation adjacent the well bore. In general, the injection pressure must be sufficient to obtain miscible displacement of the oil through the formation and out the producing well. In general, the injection pressure is maintained above about 1500 psi and particularly good oil recoveries are obtained when the injection pressure is maintained above about 2000 psi. The upper pressure limit is of course the fracture pressure of the formation. The preferred injection pressure is obviously that which achieves an economic balance between oil recovery and operational expense (See U.S. Pat. No. 4,113,011).

$CO_2$ Description

The $CO_2$ can come from any suitable source such as those described in "Miscible Displacement" by Fred I. Stalkup, Jr. (Monograph Vol. 8, Henry L. Doherty Series, ISBN NO-89520-319-7, Society of Petroleum Engineers, 1983, Chap. 8, sec. 8.4). The purity of the $CO_2$ is important. Substantially pure $CO_2$ is preferred but water saturated $CO_2$ is acceptable since water (or brine) is usually present in the formation. Usually, the $CO_2$ contains at least 95% $CO_2$ and preferably at least 98% $CO_2$, the remainder being usually light hydrocarbons. The amount of impurities in the $CO_2$ which can be tolerated is a function of the type of oil to be displaced and the type of displacement operation. For a miscible displacement operation, the $CO_2$ must generally be more pure and as the viscosity of the oil to be displaced increases so should the purity of the $CO_2$ These factors are discussed in the paper "Correlation of Minimum Miscibility Pressure for Impure $CO_2$ Streams" by H. M. Sebastian, R. S. Wenger, and T. A. Renner (SPE/DOE 12648; Paper was presented at the SPE/DOE Fourth Symposium on Enhanced Oil Recovery held in Tulsa, OK, Apr. 15-18, 1984). It is obviously a matter of economics regarding the cost for purification of the $CO_2$ versus the benefits derived from this purification.

Polymer Description

The polymers which are useful in preparing the new compositions of this invention preferably have a Minimum Solubility Parameter of about 6.85 $(cal/cc)^{\frac{1}{2}}$ or less; and contain a plurality of electron donor atoms selected from the class consisting of O, N, and S. Preferably, these electron donor atoms are a part of a donor group selected from the class consisting of siloxane; ether; thioether; sulfone; carbonyl; ester; tertiary amine; dialkylamides; and silylether. The polymers usually have a weight average molecular weight of about 1000 to 500 thousand or more, more usually from 2000 to 400 thousand.

The polymers can be solid or liquid materials at ambient conditions so long as the polymers possess the Minimum Solubility Parameter and donor group characteristics as set forth below. By "liquid" is meant that the polymer will flow at ambient conditions or have a needle penetration value of no less than about 200 by ASTM test D-1321, i.e., 20 millimeters. It is to be noted that some of the higher molecular weight polymers useful in this invention such as the polysiloxanes are extremely viscous so as to resemble greases or gums and have needle penetration values above 275.

Minimum Solubility Parameter for Polymer

The polymers should have a Minimum Solubility Parameter of about 6.85 $(cal/cc)^{\frac{1}{2}}$ or less.

The solubility parameters for many materials have been measured and are reported in various sources such as "Handbook of Solubility Parameters and Other Cohesion Parameters" by A. F. M. Barton, CRC Press, 1983. As noted by Barton, published single values of solubility parameters for polymers are not reliable guides of solubility behavior as they are for normal solvents. For polymers, the solubility parameter are best specified as a range of solubility parameter values of known solvents which either dissolve the polymer in question or at least swell (i.e., dissolve in) the polymer in question.

It is desired, of course, to devise a simple predictor test as to which polymers will successfully form a viscous solution with $CO_2$ in the presence of certain defined cosolvents. ASTM test method D3132-72, described in the Barton reference, provides a spectrum of solubility parameter values for any given polymer. The ASTM test was modified by using mixtures of n-pentane and perfluorodimethylcyclohexane as the test solutions and adding to a weighed amount of polymer enough of the test solution so that the polymer was 10% by weight of the total mixture. The solubility parameter of the test solution was varied by changing the volume fraction concentration of n-pentane in the test solution. Solubility parameters of mixtures can be calculated by volume fraction averaging of the solubility parameters of the individual components as per the teachings of Barton. The test solution compositions are shown on Table I below.

TABLE I

COMPOSITIONS AND SOLUBILITY PARAMETER OF TEST SOLUTIONS MADE BY MIXING n-PENTANE AND PERFLUORODIMETHYLCYCLOHEXANE

| Pure Component | Volume Percent Pentane | Volume Percent Perfluorodimethyl-cyclohexane | Solubility Parameter[a] |
|---|---|---|---|
| n-pentane | 100 | 0 | 7.09[b] |
| | 90 | 10 | 6.99 |
| | 85 | 15 | 6.94 |
| | 80 | 20 | 6.89 |
| | 75 | 25 | 6.85 |
| | 72 | 28 | 6.81 |
| | 70 | 30 | 6.80 |
| | 50 | 50 | 6.60 |
| | 25 | 75 | 6.36 |
| Perfluorodi-methylcyclo- | 0 | 100 | 6.11[b] |

TABLE I-continued

COMPOSITIONS AND SOLUBILITY PARAMETER OF TEST SOLUTIONS MADE BY MIXING n-PENTANE AND PERFLUORODIMETHYLCYCLOHEXANE

| Pure Component | Volume Percent Pentane | Volume Percent Perfluorodimethyl-cyclohexane | Solubility Parameter[a] |
|---|---|---|---|
| hexane | | | |

[a]Calculated by volume fraction averaging of parameters of two pure components except where otherwise noted.
[b]"Handbook of Solubility Parameters and Other Cohesion Parameters," CRC Press, Chapter 8, Table 5.

A series of different polymers were added at the 10 weight percent level to the various n-pentaneperfluorodimethylcyclohexane solutions listed in Table I above in order to determine the lowest value of the solubility parameter of a solution in which the given polymer was soluble This lowest value solubility parameter is defined herein as the Minimum Solubility Parameter of the polymer. As will be shown below, the Minimum Solubility Parameter for the polymers to be used in the new compositions and process of this invention is about 6.85 (cal/cc)$^{\frac{1}{2}}$ or less In other words, if a given polymer is soluble at the 10 weight percent level in a mixture of n-pentane and perfluorodimethylcyclohexane wherein said mixture has a solubility parameter of about 6.85 or less, then such polymer is an acceptable polymer for use in the compositions and process of this invention provided further that such polymer satisfies the other criteria set forth in this specification. By "about 6.85" is meant 6.85±0.02 since the determined value of the solubility parameter of the n-pentaneperfluorodimethylcylcohexane mixture might be off by a factor of ±0.02. By "soluble" is meant that the components form a one-phase solution. By "insoluble" is meant that a second phase is observed (i.e., a second liquid phase or a solid phase).

The results of this set of runs are shown in Table II below.

TABLE II

POLYMER SOLUBILITY IN TEST SOLUTIONS OF KNOWN SOLUBILITY PARAMETER

| | Polymer | Reported Solubility Parameter | Test Solution Solubility Parameter (cal/cc)$^{\frac{1}{2}}$ | | | | | | | |
|---|---|---|---|---|---|---|---|---|---|---|
| | | | 7.09 | 6.99 | 6.94 | 6.89 | 6.85 | 6.81 | 6.80 | 6.60 |
| A | Polydecene SF-0802[a] | 8.2[b] | sol | — | — | — | sol | insol | insol | insol |
| B | Polydecene BSW-102[a] | — | — | — | — | sol | insol | — | — | — |
| C | Polydecene 418-60[a] | — | — | — | — | sol | insol | — | — | — |
| D | Polydecene 430-418[a] | — | sol | — | — | sol | insol | — | — | — |
| E | Polydimethyl siloxane 60 k cSt[c] and [d] | 7.4[c] | sol | — | — | — | sol | insol | insol | insol |
| F | Polydimethyl siloxane 100 k (c)St (GE)[d] | — | sol | — | — | sol | sol | insol | insol | — |
| G | Polydimethy siloxane 300 k (c)St (GE)[d] | — | sol | — | — | — | sol | insol | insol | insol |
| H | Polydimethy siloxane 600 k (c)St (GE)[d] | — | sol | — | — | — | sol | insol | — | — |
| I | Poly(ethyl vinyl ether) #154 (low MW)[c] | 7-11.5[e] | sol | — | — | — | sol | sol | insol | insol | insol |
| J | Poly(ethyl vinyl ether) #638 (high MW)[c] | 7-11.5[e] | sol | sol | sol | insol | insol | insol | — | — |
| K | Poly(isobutyl vinyl ether) #425[c] | 8-11[f] | insol | — | — | insol | — | insol | — | — |
| L | Poly(2-ethylhexyl acrylate) #249[c] | 7-13[e] | sol | sol | sol | insol | insol | insol | — | insol |
| M | Poly(propylene glycol) MW = 4000[c] | — | sol | sol | insol | insol | — | — | insol |
| N | Poly(ethylene glycol) PEG-3[g] | — | insol | — | — | — | — | — | — | — |
| O | Poly(ethylene glycol) PEG-5[g] | — | insol | — | — | — | — | — | — | — |
| P | Poly(isobutylene)[c] #040A | 7.5-8[e] | sol | insol | insol | insol | — | insol | — | — |
| Q | Atactic polypropylene (heptane soluble)[h] | — | insol | — | — | — | — | — | — | — |
| R | Poly(butadiene)[c] | 8.04[c] | insol | — | — | — | — | — | — | — |
| S | Poly(laurylacrylate) | — | sol | sol | sol | insol | insol | — | — | — |
| T | Poly(laurylmethacrylate) | 8.2[c] | — | sol | sol | insol | insol | — | — | — |
| U | Poly(octadecylmethacrylate) | 7.8[c] | sol | sol | sol | insol | insol | — | — | — |

[a]Polydecene-based Synfluid produced at Gulf Research & Development Company.
[b]Calculated by a group contribution method given in K. Brandup and E. H. Immergut, Ed., Polymer Handbook, Wiley Interscience, NY, 1966.
[c]Scientific Polymer Products, Inc. catalog.
[d]GE means purchased from General Electric.
[e]"Handbook of Solubility Parameters and Other Cohesion Parameters," CRC Press, Chapter 14, Table 1.
[f]Reference [e], Table 2.
[g]Pressure Chemical Company.
[h]Produced at Gulf Research & Development Company.

Referring to Table II, it can be observed that all of the polymers tested were insoluble in test solutions having a solubility parameter of 6.81 or less. It can also be observed that when the solubility parameter of the test solution was 6.85, that one of the polydecenes (i.e., Polymer A) was soluble; all of the polydimethylsiloxane polymers (i.e., Polymers E, F, G, and H) were i0 soluble; and Polymer I representing a low molecular weight polyethylvinylether was soluble while the remaining polymers tested in Table II were insoluble in a test solution having a solubility parameter of 6.85.

Summarizing from the results in Table II, it can be seen that only Polymers A, E, F, G, H, and I were soluble in the test solution having a known solubility parameter of 6.85 or less. As will be shown later, all of these polymers except Polymer A were useful in viscosifying $CO_2$ to an acceptable level. Polymer A failed as it did not contain the requisite donor group capacity as set forth below.

Donor Group Capacity of Polymer

The polymers suitable for use in the compositions and method of this invention should also contain a certain amount of electron donor atom capacity. Carbon dioxide is a weak Lewis acid [See, A. L. Myers and J. M. Prausnitz, Ind. Eng. Chem. Fund., 4,209 (1965)] and, for reasons which are not fully understood, it appears to be preferred that the polymers have some strong donor functionality which can interact in some donor-acceptor fashion with carbon dioxide. This donor capacity can be evidenced by the presence in the polymer macromolecule of a plurality of electron donor atoms selected from the class consisting of oxygen, nitrogen, and sulfur. Preferably, the electron donor atom is from 3 to 35 weight percent of the polymer molecule, more preferably from 6.5 to 30 weight percent and most preferably from 10 to 27.5 weight percent of the polymer molecular. Polymer molecules containing mixtures of oxygen, nitrogen, and sulfur can also be employed.

Preferably, the oxygen electron donor atom is part of a donor group selected from the class consisting of siloxane, ether, silylether, carbonyl, and ester. The nitrogen is preferably part of a donor group selected from the class consisting of tertiary amine and dialkylamides. The sulfur is preferably part of a donor group selected from the class consisting of thioether and sulfone.

The preferred donor groups referred to above can be represented by the following formulas:

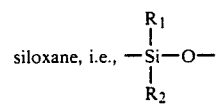 (a)

where $R_1$ and $R_2$ are as described later; ether, i.e., ROR (b)

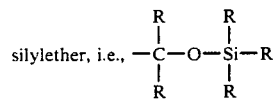 (c)

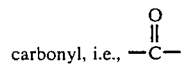 (d)

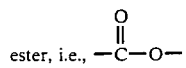 (e)

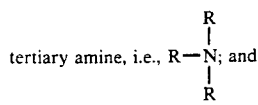 (f)

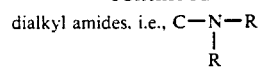 (g)

 (h)

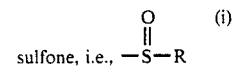 (i)

where R would be the same or different and is a hydrocarbyl group having from 1 to 20 carbon atoms and preferably 1 to 4 carbon atoms. More preferably, the hydrocarbyl group is saturated.

The above electron donating groups can be present alone or in admixture in the backbone chain of the polymer or be present as pendant groups.

Data are presented in Table III below which illustrate the effect of the presence of donor groups in certain polymers on the solubility of the polymers in a $CP_2$-toluene mixture. Polymers A, E, F, G, H, and I from Table II above (the only polymers from Table II having a Minimum Solubility Parameter of 6.85 or less) were tested and the results are shown in Table III below.

In each instance, the indicated amount of polymer was added along with 30 cc of toluene to a reactor which was then pressured with $CO_2$ to approximately 3500 psig and 35° C. In each instance, the contents of the reactor were stirred vigorously for one hour and then the contents allowed to settle for one-half hour before displacing the contents with water preparatory to an analysis of the contents to determine the weight percent polymer, as set forth hereinafter in the Experimental Work section.

TABLE III

| Polymer | Grams of Polymer Added to Toluene-$CO_2$ | Weight Percent of Polymer Present in the $CO_2$-Toluene |
|---|---|---|
| A | 10.1 | 1.55 |
| E | 30.0 | 12.4 |
| F | 30.0 | 10.6 |
| G | 30.0 | 10.8 |
| H | 30.0 | 8.8 |
| I | 60.0 | 19.8 |

Referring to Table III, in the case of Polymers E, F, G, H, and I, all of the Polymer added was found by analysis to be actually dissolved. In the case of Polymer A, only about 40% of the Polymer A added was found by analysis to be actually dissolved. As will be shown later, only Polymer A failed to sufficiently increase the viscosity of $CO_2$ to a useful degree. It should be noted that Polymer A does not contain any electron donor groups whereas Polymers E through H contain siloxane linkages (or groups); and Polymer I contains an ether linkage.

The above data illustrate that the Polymers for use in the subject invention should not only have a Minimum Solubility Parameter of about 6.85 (cal/cc)$^{\frac{1}{2}}$ or less as determined by ASTM Test D3132-72, modified as described above, but should also contain a plurality of donor groups. Polymers B, J, L, M, 0, P, R, S, and T were also tested for their solubility in the 90% $CO_2$-10 volume % toluene mixture under the same conditions as described above, except that Polymers 0 and R were run using butanol as cosolvent and Polymer P was run using heptane as cosolvent but only a trace to less than one weight percent of the Polymer was dissolved in every instance.

It is more preferred that the polymer be a polysiloxane. The polysiloxanes can suitably have the

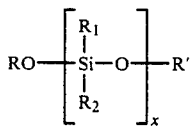

where R and R' can be the same or different and can be hydrogen or any hydrocarbyl having from 1 to 10 carbon atoms, preferably 1 to 4 carbon atoms, and most preferably 1 to 2 carbon atoms;

X can be from 100 to 7,000; preferably 1,000 to 5,000; and most preferably 1,500 to 4,000; and $R_1$ and $R_2$ can be the same or different and can be selected from the group consisting of:

(a) any hydrocarbyl group having from 1 to 10 carbon atoms, preferably 1 to 4 carbon atoms, and most preferably 1 to 2 carbon atoms, or (b) a siloxane group.

The preferred polysiloxane is where R, R', $R_1$ and $R_2$ are all methyl.

The polysiloxanes are available commercially from such companies as General Electric, Dow Corning, and Union Carbide. The polysiloxanes are normally available in accordance with their kinematic viscosity. As noted from Table II above, polysiloxanes having 60,000; 100,000; 300,000; and 600,000 cSt at 77° F. were tested and all were found acceptable. (These are Polymers E, F, G, and H in Table II.) By acceptable is meant that these polysiloxanes, when used in combination with the cosolvents to be described below, were effective viscosifying agents for carbon dioxide. Suitable polysiloxanes therefore are those having a kinematic viscosity of 20,000 cSt to 8,000,000 cSt at 77° F. and are liquid or have needle penetration values above 200. One experimental polysiloxane had a viscosity on the order of 2.3 million cSt and a needle penetration value of greater than 380 (380 is the maximum number for the test, the higher the number the more liquid-like is the material being tested). Another experimental polysiloxane had a viscosity of about 7 million cSt and a needle penetration value of 292. For contrast, a polyisoprene and a polyisobutylene which were solid and rubbery had needle penetration values of 32 and 46, respectively, while a solid polyethyleneglycol (molecular weight of 1500) had a needle penetration value of 6 and Polymer J from Table II) the high molecular weight polyvinylethyl ether) had a needle penetration value of 127.

Another group of preferred polymers are the polyvinylether materials represented by the formula:

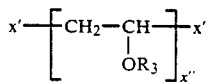

where x' is H, OH, halogen, or

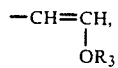

and where x'' is from 20 to 3000; preferably 30 to 1000;and more preferably 30 to 500 and wherein $R_3$ can be a hydrocarbyl group having from 1 to 10, preferably 1 to 4, most preferably 1 to 2 carbon atoms.

For reasons which are not fully understood, a high molecular weight polyethylvinylether (i.e., where x was 625) was not suitable, whereas a low molecular weight polyvinylether was (i.e., where x was 30). As noted, however, it is easy to distinguish between those polyvinylethers which are acceptable and those which are not by determining the Minimum Solubility Parameter of the polymer as noted above, and if that Minimum Solubility Parameter is 6.85 $(cal/cc)^{\frac{1}{2}}$ or less, then the polyvinylether is acceptable. Thus, the polymers for use in the compositions and method of this invention preferably contain both the Minimum Solubility Parameter and the donor capacity characteristics.

Cosolvent

Another key element in the subject invention is the discovery that certain materials defined below can serve to dissolve the above-described Polymers to form a $CO_2$-polymer-cosolvent solution wherein the viscosity of the $CO_2$ is increased at least three-fold.

The cosolvent should be capable of forming a one-phase admixture with the selected polymer at ambient temperature and a pressure sufficient to maintain the cosolvent in the liquid phase when in the admixture the cosolvent equals 10% by weight of the polymer. By a "one-phase admixture" is meant the cosolvent has dissolved into the polymer and a separate liquid phase is not observed. In addition, the cosolvent should be capable of being dissolved to at least the two weight percent level, preferably four weight percent level or above, into liquid $CO_2$ at 25° C. and 950 psig.

It is a simple matter for one having ordinary skill in the art to determine by a simple experiment (i) whether a given liquid cosolvent will form a one-phase admixture with a selected polymer at ambient temperature, i.e., about 25° C. and a pressure sufficient to maintain the cosolvent in the liquid phase using a cosolvent polymer admixture wherein the cosolvent equals 10% by weight of the polymer, and (ii) similarly whether the cosolvent will dissolved in $CO_2$ at 25° C. and 950 psig to at least the two weight percent level. If these two simple tests are met, then the selected cosolvent will be suitable for use with the selected polymer in the compositions and method of this invention.

As a class, it would appear that many materials, including the following materials, are suitable for use as cosolvents in this invention:

(a) alcohols having from 1 to 8 carbon atoms, such as methanol; ethanol; isopropyl alcohol; hexanol; cyclohexanol; etc.;

(b) aromatics having a single ring and from 6 to 10 carbon atoms such as benzene; toluene; and the xylenes;

(c) ketones having from 3 to 10 carbon atoms such as methylethylketone; dipropylketone; methyloctylketone; and acetone;

(d) carboxylic acid esters where the carboxylic acid portion has from 2 to 4 carbon atoms and the ester portion has from 1 to 10 carbon atoms such as ethylacetate; ethylpropionate; hexylacetate; etc.; and (e) hydrocarbons having from 2 to 20 carbon atoms such as propane; pentane; propylene; cyclohexane; isobutane; heptane; methylcyclohexane; octane; butylenes; 1-octene; or mixtures thereof including refinery streams such as naphthas, kerosene, gas oils, gasolines, etc. Preferably the hydrocarbons are aliphatic hydrocarbons having from 2 to 10 carbon atoms.

The preferred cosolvents for use with the preferred polysiloxane polymers are those liquid cosolvents which not only meet the criteria set forth above, but, in addition, have a dielectric constant of less than 30 at 25° C. Even more preferred cosolvents for use with the preferred polysiloxane polymers are those which, in addition, have a solubility parameter at 25° C. of 7.0 to 12.0 $(cal/cc)^{\frac{1}{2}}$.

One technique for obtaining the desired cosolvent on-site is to contact the $CO_2$ in a liquid-liquid extraction apparatus with recovered crude or a fraction of such crude for a sufficient time to permit the $CO_2$ to extract enough light hydrocarbons to function as the cosolvent. The desired amount of polymer would then be added to the $CO_2$-light hydrocarbon extract to form the oil-driving material.

Amounts of $CO_2$ Polymer and Cosolvent

The new compositions of this invention comprise from 70 to 99.9 weight percent carbon dioxide (usually from 80 to 99 weight percent $CO_2$ and preferably 85 to 99 weight percent $CO_2$) and a sufficient amount of a mixture of a polymer and a cosolvent, both as defined above, to effect at least a three-fold increase in the viscosity of the $CO_2$. Usually the weight percent polymer in the mixture is from 0.05 to 20 weight percent and more usually the amount of polymer is from 0.1 to 10 weight percent. The amount of cosolvent is at least sufficient to dissolve the desired amount of polymer in the $CO_2$ and, as noted above, is at least 40% by weight of the polymer employed. This amount of cosolvent is usually from 0.05 to 30 weight percent of the final mixture, more usually from 0.1 to 15 weight percent.

The weight ratio of the cosolvent to polymer in the new compositions of this invention can be from 0.4:1 to 600:1; is preferably from 0.4:1 to 15:1; and more preferably from 0.5:1 to 1.5:1.

Experimental Work

The invention will be further described with reference to the following experimental work.

Equipment was designed for the measurement of polymer solubility and $CO_2$-cosolvent-polymer solution viscosity. The system consists of a one-pass flow system in which pressure is maintained by a back-pressure valve (74 on FIG. 1). Polymer, $CO_2$, cosolvent and water are mixed in an autoclave (24 on FIG. 1) and then displaced from the autoclave 24 by the slow addition of water and passed through a capillary in a constant temperature oven for the indirect measurement of viscosity using a differential pressure transducer. The polymer-cosolvent-$CO_2$ mixture is then passed to a collector vessel which, after vacuum removal of all components except that polymer, is weighed to determine the weight of the polymer contained in the known volume (weight) of solution. A more detailed description is provided below with reference to FIG. 1.

$CO_2$ which enters through line 8 is pumped by pump 10 (a Ruska pump) through line 12 to valve 20. Pressure gauge 16 is installed to register the pressure of $CO_2$ from line 12 through line 14. A vent valve 18 is provided for safety reasons. Valve 20 is a three-way valve and $CO_2$ may be passed through line 22 into autoclave 24 which is provided with a stirrer 26. Water can be added to autoclave 24 through line 28, pump 30 and line 32.

In a typical experiment, 3 ml of water and the desired amounts of cosolvent and polymer are added to the 300 ml autoclave 24. The purpose of adding the water is to saturate the $CO_2$ and 3 ml of water are more than enough to saturate the amount of $CO_2$ which the autoclave holds. The autoclave 24 is then sealed and flushed twice with 250 psig of $CO_2$ entering through line 22 in order to remove any residual air in the autoclave 24 which is thereafter heated while $CO_2$ is added through line 22 until the desired temperature and pressure are reached, usually 35° C. and 3500 psig. During this operation, valve 34, a two-way valve, is closed. Valve 20 is then closed to stop any further flow of $CO_2$ through line 22.

The mixture of $CO_2$, polymer, water and cosolvent is stirred with stirrer 26 for one hour and allowed to settle without stirring for one-half hour. During the time period this mixture is being stirred and allowed to settle, valve 34 is opened to allow flow of $CO_2$ through valve 36, line 38 and into a constant temperature oven 40. The $CO_2$ is heated to the desired temperature (35° C.) by passage through heating coil 42. The $CO_2$ then passes through line 44 and filter 46 (to remove any possible solids) into a capillary 50 through line 48. A pressure gauge 52 is provided as is a bypass valve 54. A differential pressure transducer 56 measures the difference in pressure across the capillary 50 and this differential pressure measurement is used to establish a first $CO_2$ baseline viscosity using the well-known Pouseille Equation which relates viscosity to a change in differential pressure (see, N. DeNevers, "Fluid Mechanics," Addison-Wesley, Reading, Mass., 1970, pp. 162–8, for a discussion and calculations involved in the Pouseille Equation).

The $CO_2$ then passes through line 58 and switching valve 60 either through line 66 into a collector 62 containing a tared glass tube 64 and then through line 67 to line 68 or directly to line 68. The $CO_2$ then flows through sight glass 70, line 72 and backpressure valve 74. Heptane or other suitable material is pumped through pump 76 and line 78 to clean the backpressure valve 74. Vent valves 84 and 86 are provided as noted along with pressure gauges 80 and 82.

After the settling period described above, the $CO_2$-polymer-cosolvent mixture is displaced from autoclave 24 by the addition of water at the rate of 0.3 ml per minute through line 32. The displacement is effected, of course, by closing valve 34 and opening valve 36. The displaced $CO_2$-polymer-cosolvent mixture passes through line 38 pushing $CO_2$ in front of it through the capillary 50 to provide a second $CO_2$ baseline viscosity used for viscosity measurements. After a stable $CO_2$-polymer-cosolvent flow (as evidenced by plateauing of differential pressure across the ends of capillary tube 50) is achieved, a fraction of the mixture is collected in tube 64 to determine the amount of polymer dissolved in the mixture. During the displacement, observations of the various phases present can be made by means of the sight-glass 70 through which the mixture passes on its way out through back-pressure valve 74. Carbon dioxide at atmospheric pressure flows through line 88 to wet test gas meter 90 used to measure $CO_2$ flow. Using the Ideal Gas Law and $CO_2$ fluid densities at the pressure and temperature of the environment, $CO_2$ gas flow rates can be related to flow rates of compressed $CO_2$.

At the end of the viscosity data collection and solubility sampling, the system is switched back to pure $CO_2$ to flush out the polymer and to obtain a third pure $CO_2$ viscosity baseline The last baseline viscosity ensures that no polymer is left coated on the capillary which could reduce the capillary radius and thus cause an anomalously high viscosity since the viscosity is a function of the pressure differential across the tube which is, in turn, a function of the radius of the capillary.

Solubility Determination

As noted above, a fraction of the mixture is collected in tube 64 by displacing a portion of the pure $CO_2$ which was charged to collector 62 earlier The $CO_2$ is vented and the tared glass tube 64 removed and the cosolvent evaporated in a vacuum oven (27" of water, 60° C. for 2 days) and the weight of dissolved polymer is determined by difference in weight. The weight of $CO_2$ is determined by wet test gas meter 90 readings at the beginning of collection when valve 60 is opened to divert flow to collector 62 and at the end of collection when valve 60 is closed to divert flow away from the collector and end the collection Corrections for the presence of cosolvent are made using the nominal concentration based on volume added and a nominal 300 ml autoclave 24 volume. Polymer solubilities are expressed as weight percent in solvent based on the formula (assuming the change of volume of mixing=0):

$$\text{Solubility (wt \%)} = \frac{\text{WT Polymer}}{\text{WT CO}_2 + \text{WT Cosolvent} + \text{WT Polymer}} \times 100$$

Viscosity Measurement

Viscosity measurement is accomplished by measurement of the pressure difference (DP) due to flow of $CO_2$-cosolvent-polymer solution through a long capillary of small radius. The Pouseille Equation relates viscosity to DP and to flow rate in cc/min and can be used to size a capillary for an expected viscosity and DP range. In these experiments, a capillary 5' long with an internal diameter of 0.010" was used.

To calculate viscosity, the ratio of differential pressure of the polymer solution to the differential pressure of $CO_2$ only from the second $CO_2$ baseline DP measurement is calculated. In the water displacement of the experiment, there is a constant liquid flow rate through the system as long as the temperature is constant and the pressure maintained by the back-pressure valve 74 is constant. Substitution into the Pouseille Equation shows that the ratio of the viscosity of the viscous $CO_2$ to the viscosity of $CO_2$ equals the ratio of the change in pressure over the capillary 50 for the viscous $CO_2$ to the change in pressure over the capillary 50 for $CO_2$, as long as the flow rate is the same for both the baseline $CO_2$ and the $CO_2$-polymer differential pressure data. To get actual viscosity, the viscosity ratio is multiplied by the actual carbon dioxide viscosity under the experimental conditions. Viscosities in this application for the $CO_2$-polymer-cosolvent solutions are reported as viscosity ratios (relative viscosities).

Experiments:

Experimental Conditions and Parameters

A standard set of conditions was chosen for all solubility/viscosity experiments. Unless otherwise indicated, all runs were done at 3500 psig pressure, 35° C., and with water-saturated $CO_2$. Under these conditions, the viscosity of $CO_2$ is 0.086 centipoises, the density is 0.892 g/cc, and the water solubility is 1800 $ppm_w$.

It was found that in the absence of a cosolvent the addition of water in sufficient amounts to saturate the $CO_2$ had a deleterious affect on the solubility of polymers in the $CO_2$. Nevertheless, since water is always present together with oil in underground formations, any $CO_2$ flood would become saturated with water while traversing the formation from the injection to the producing well. Therefore, water was added to the $CO_2$-cosolvent-polymer mixtures to ensure a water-saturated system which would more closely approximate the conditions found in a formation.

Properties of Polymers Used

The properties of all of the polymers from Table II are set forth below in Table IV for reference.

TABLE IV

| Polymer from Table II | Polymer Family | Molecular Weight[a] $M_n$ | Molecular Weight[a] $M_w$ | Kinematic Viscosity[b] at 77° F. in Centistokes | Liquid[e] | Donor Group | Minimum Solubility Parameter[g] $(cal/cc)^{\frac{1}{2}}$ | Weight % Electron Donor Atom in the Polymer |
|---|---|---|---|---|---|---|---|---|
| A | Polydecene | 579 | 616 | 8[c] | Liquid | None | 6.85 | 0 |
| B | Polydecene | 889 | 1,228 | 26.5[c] | Liquid | None | 6.89 | 0 |
| C | Polydecene | 1,352 | 2,290 | 88.1[c] | Liquid | None | 6.89 | 0 |
| D | Polydecene | — | — | — | Liquid | None | 6.89 | 0 |
| E | Polydimethylsiloxane | — | 110,000[d] | 60,000 | Liquid | Siloxane | 6.85 | 21.6 |
| F | Polydimethylsiloxane | — | 153,000[d] | 100,000 | Liquid | Siloxane | 6.85 | 21.6 |
| G | Polydimethylsiloxane | — | 193,000[d] | 300,000 | Liquid | Siloxane | 6.85 | 21.6 |
| H | Polydimethylsiloxane | — | 197,000[d] | 600,000 | Liquid | Siloxane | 6.85 | 21.6 |
| I | Polyvinylethylether | 1,351 | 2,824 | 4,692 | Liquid | Ether | 6.85 | 22.2 |
| J | Polyvinylethylether | 5,746 | 43,512 | — | Rubbery | Ether | 6.94 | 22.2 |
| K | Polyvinylisobutylether | 11,319 | 31,892 | — | Solid | Ether | >7.09 | 16.0 |
| L | Poly 2-ethylhexyl-acrylate | — | — | — | Liquid | Ester | 6.94 | 9.9 |
| M | Polypropyleneglycol | 2,539 | 3,941 | 930 | Liquid | Ether | 6.99 | 27.6 |
| N | Polyethyleneglycol | 591[f] | 633[f] | — | Liquid | Ether | >7.09 | 36 |
| O | Polyethyleneglycol | 1,464[f] | 1,545[f] | — | Solid | Ether | >7.09 | 36 |
| P | Polyisobutylene | 9,220 | 24,808 | — | Solid | None | 7.09 | 0 |
| Q | Atactic Polypropylene | NOT RUN | | | Solid | None | >7.09 | 0 |
| R | Polybutadiene | — | 900[f] | — | Liquid | None | >7.09 | 0 |
| S | Polyaurylacrylate | 6,441 | 14,241 | — | Liquid | Ester | 6.94 | 13.3 |
| T | Polyaurylmethacrylate | 4,760 | 23,510 | — | Liquid | Ester | 6.94 | 12.5 |
| U | Polyoctadecyl- | 4,030 | 19,405 | — | Solid | Ester | 6.94 | 9.5 |

TABLE IV-continued

| Polymer from Table II | Polymer Family | Molecular Weight[a] $M_n$ | $M_w$ | Kinematic Viscosity[b] at 77° F. in Centistokes | Liquid[e] | Donor Group | Minimum Solubility Parameter[g] (cal/cc)$^{\frac{1}{2}}$ | Weight % Electron Donor Atom in the Polymer |
|---|---|---|---|---|---|---|---|---|
| | methacrylate | | | | | | | |

[a]$M_n$ and $M_w$ determined by GPC using a polydecene calibration curve derived from known polydecene standards.
[b]Viscosity determined by ASTM Test Method D445.
[c]Viscosity determined at 210° F.
[d]$M_w$ determined by GPC with a polystyrene calibration curve.
[e]LIQUID means LIQUID at ambient conditions. By Liquid is meant a material which flows or has a needle penetration value by ASTM Test D1321 of no less than about 200 at 77° F.
[f]Values reported by vendor-see Footnote [g] in Table II.
[g]Taken from Table II above.

Properties of Cosolvents Used

A number of cosolvents were employed in the experiments to follow and the properties of the cosolvents are shown in Table V below.

Isobutane was not run for solubility in liquid $CO_2$ since it is similar to propane and heptane (cosolvents 18 and 16, respectively, in Table V) which were miscible with $CO_2$.

Tetrahydrofuran is a five-membered cyclic ether and

TABLE V

PROPERTY OF COSOLVENTS

| Cosolvent | Dielectric Constant at 25° C.[a] | Solubility Parameter (cal/cc)$^{\frac{1}{2}[c]}$ at 25° C. | Solubility in Liquid $CO_2$(Wt %)[d] at 25° C. and 950 psig | 10% Swelling Polymer E[f] | 10% Swelling Polymer I[f] |
|---|---|---|---|---|---|
| 1. Methanol | 32.6 | 14.47 | M[e] | N | Y |
| 2. Ethanol | 24.3 | 12.71 | M | Y | — |
| 3. Propanol | 20.1 | 11.88 | — | Y | — |
| 4. 1-Butanol | 17.1 | 11.39 | — | Y | — |
| 5. 1-Octanol | 10.3[b] | 10.32 | — | Y[k] | Y |
| 6. Cyclohexanol | 15.0 | 11.39 | 4 | Y | — |
| 7. 2-Methoxyethanol | 16.0[h],[i] | 11.39 | M | Y | Y |
| 8. Ethylene Glycol | 37.7 | 14.61 | 0.2 | N | Y |
| 9. Acetone | 20.7 | 9.88 | M | Y | Y |
| 10. Methylethyketone | 18.51[b] | 9.29 | M | Y | Y |
| 11. Tetrahydrofuran | 7.61[g],[h] | 9.09 | — | Y | Y |
| 12. Ethyl Acetate | 6.02 | 9.09 | M | Y | Y |
| 13. Acetonitrile | 36.2[i] | 11.88 | M | N | Y |
| 14. Toluene | 2.38 | 8.90 | M | Y | Y |
| 15. Heptane | 1.92 | 7.38 | M | Y | Y |
| 16. Propylene | 1.87[b] | 7.17 | M | — | — |
| 17. Propane | 1.61[b] | 6.57 | M | — | — |
| 18. Isobutane | — | 6.92 | — | — | — |
| 19. Hydrogen Sulfide | 9.04[j] | 8.44[l] | M | — | — |

[a]From Handbook of Chemistry and Physics, 58th ed., CRC Press, 1977, pp. E-55-8.
[b]At 20° C.
[c]From A. M. F. Barton, "Handbook of Solubility Parameters and Other Cohesion Parameters," CRC Press, 1984, Chapter 8, Table II, pp. 142-149.
[d]A. W. Francis, J. Phys. Chem., 58, 1099 (1954).
[e]"M" means miscible in all proportions.
[f]Polymer from Table II and Y means "yes" and N means "no".
[g]See Footnote [c] above, Chapter 8, Table II, p. 172.
[h]At 30° C.
[i]From A. J. Gordon and R. A. Ford, The Chemists Companion, Wiley interscience, NY, 1972.
[j]At 78° C.
[k]Took longer than 48 hours to make the admixture.
[l]Estimated from FIG. 1, p. 115 of Barton Reference in Footnote [c] above.

Referring to Table V, the "10% Swelling" notation refers to the criteria whether the cosolvent is capable of forming a one-phase admixture with the selected polymer at ambient temperature, i.e., about 25° C. and a pressure sufficient to maintain the cosolvent in the liquid phase (in all cases in Table V atmospheric pressure) when, in the admixture, the cosolvent equals 10% by weight of the polymer. Propylene, propane, isobutane and Hhd 2S were not run to determine if they would form the one-phase admixture as equipment was not available to liquefy these materials at 25° C. It can be inferred, however, that these materials will form the one-phase admixture since each of these materials was found to be an effective cosolvent as seen from the results of Run Numbers 38-41 in Table II to follow.

was not tested for solubility in $CO_2$ as it is expected to be miscible since the A. W. Francis reference in Footnote (d) indicates that diethylether, dibutylether and p-dioxane are miscible.

$CO_2$ Viscosity Runs

A series of experiments was run using the apparatus of FIG. 1 with each of the Polymers from Table II except Polymers C, D, K, N, Q, and U to determine the viscosity of the $CO_2$-polymer-cosolvent mixture; the concentration of the polymer in the mixture (i.e., wt % polymer in the mixture) and the viscosity ratio of the mixture. By "viscosity ratio" (or relative viscosity) is meant the ratio of the viscosity of the $CO_2$-cosolvent-polymer solution to the viscosity of pure $CO_2$ under the same conditions of temperature and pressure. The results are shown in Table VI below.

TABLE VI

| Run Number | Polymer | Polymer Wt. Added (g) | Co-solvent | Cosolvent Volume Added (ml) | Cosolvent Swelling | Donor Group | Composition of Mixture $CO_2$ Wt % | Cosolvent Wt % | Polymer Wt % | $CO_2$ Cosolvent Polymer Viscosity Ratio |
|---|---|---|---|---|---|---|---|---|---|---|
| 1 | A | 10.1 | Toluene | 30 | Y[a] | None | 90.2 | 8.2 | 1.6 | 1.24 |
| 2 | B | 10.33 | Toluene | 30 | Y | None | 91.1 | 8.2 | 0.7 | 1.34 |
| 3 | C | Not Run | — | — | — | None | — | — | — | — |
| 4 | D | Not Run | — | — | — | None | — | — | — | — |
| 5 | E | 40.0 | Toluene | 30.0 | Y | Siloxane | 79.5 | 8.1 | 12.4 | 22.9 |
| 6 | F | 30.2 | Toluene | 30.0 | Y | Siloxane | 81.3 | 8.1 | 10.6 | 23.5 |
| 7 | G | 30.0 | Toluene | 30.0 | Y | Siloxane | 81.1 | 8.1 | 10.8 | 34.1 |
| 8 | H | 24.4 | Toluene | 30.0 | Y | Siloxane | 83.1 | 8:1 | 8.8 | 29.5 |
| 9 | I | 50.23 | Toluene | 30.0 | Y | Ether | 70.0 | 10.2 | 19.8 | 4.81 |
| 10 | J | 13.12 | Toluene | 30.3 | Y | Ether | 90.9 | 8.2 | 0.9 | 1.0 |
| 11 | K | Not Run | — | — | — | Ether | — | — | — | — |
| 12 | L | 12.75 | Toluene | 30.0 | Y | Ester | 91.7 | 8.1 | 0.2 | 1.0 |
| 13 | M | 10.05 | 1-butanol | 30.0 | Y | Ether | 92.1 | 7.7 | 0.2 | 1.2 |
| 14 | N | Not Run | — | — | — | — | — | — | — | — |
| 15 | O | 6.0 | 1-butanol | 30 | — | Ether | 92.2 | 7.7 | 0.1 | 1.1 |
| 16 | P | 4.56 | heptane | 22.95 | Y | None | 94.7 | 5.2 | 0.1 | 1.0 |
| 17 | Q | Not Run | — | — | — | None | — | — | — | — |
| 18 | R | 8.9 | 1-butanol | 30.0 | Y | Olefin | 91.9 | 7.7 | 0.4 | 1.0 |
| 19 | S | 10.01 | Toluene | 46.2 | Y | Ester | 87.9 | 11.5 | 0.6 | 1.2 |
| 20 | T | 10.02 | Toluene | 56.44 | Y | Ester | 86.4 | 13.4 | 0.2 | 1.0 |
| 21 | U | Not Run | — | — | — | Ester | — | — | — | — |

[a] Y means "yes", i.e., the cosolvent formed a one-phase admixture with the polymer wherein the cosolvent is 10% by weight of the polymer.

Referring to Table VI, it can be seen that only Runs 5 through 9 using Polymers E through I resulted in at least a three-fold $CO_2$ viscosity increase. These polymers represent various polysiloxanes and polyvinylethylether. Polymer A possessed the necessary Minimum Solubility Parameter as seen from Table IV above but had no donor group capacity and thus resulted in little $CO_2$ viscosity increase even though an excellent cosolvent, i.e., toluene was employed. Polymer B (Run 2) showed a small increase in viscosity, i.e., about a 30% increase. This result confirms the work of Heller et al. Polymers C and D were not run as the results should be redundant over Polymers A and B since these polymers are also polydecenes.

Polymer K was not run as its Minimum Solubility Parameter was too high as were those of Polymers N and Q. Polymer U was not run as it was deemed redundant over Polymer T.

Thus, the results in Table VI illustrate that certain families of polymers are suitable for use in the subject invention, namely, the polysiloxanes and polyvinylethers albeit even some members of these families can be excluded if they do not possess the Minimum Solubility Parameter and/or donor characteristics as defined above.

Further experiments were performed in a manner similar to the experiments set forth in Table VI using a variety of cosolvents in order to determine the different types of cosolvents which can be employed with either the polysiloxanes or the polyvinylethers The results for the polysiloxane (Polymer E)-cosolvent runs are set forth in Table VII below and the results for the polyvinylethylether (Polymer I) cosolvent runs are set forth in Table VIII below. Polymer E was selected as representative of polysiloxanes and Polymer I as representative of polyethylvinylethers.

TABLE VII

POLYSILOXANE - COSOLVENT DATA

| Run Number | Wt. Polymer E Charged (g) | Cosolvent | Volume Cosolvent Charged (ml) | Co-solvent Swelling[a] | Cosolvent Solubility Parameter $(cal/cc)^{\frac{1}{2}}$ at 25° C. | Composition of Mixture $CO_2$ (wt %) | Cosolvent (wt %) | Polymer (wt %) | $CO_2$—Cosolvent-Polymer E Viscosity Ratio |
|---|---|---|---|---|---|---|---|---|---|
| 22 | 8.3 | None | 0 | — | — | 99.8 | 0.0 | 0.2 | 1.1 |
| 23 | 29.8 | Ethylene Glycol | 30.0 | N | 14.61 | 89.2 | 10.1 | 0.7 | 1.0 |
| 24 | 30.7 | Methanol | 30.0 | N | 14.47 | 90.1 | 7.4 | 2.5 | 1.9 |
| 25 | 30.6 | Acetonitrile | 30.0 | N | 11.88 | 91.4 | 7.4 | 1.2 | 1.2 |
| 26 | 29.9 | Ethanol | 30.0 | Y | 12.71 | 82.1 | 7.4 | 10.5 | 14.9 |
| 27 | 24.5 | 1-Butanol | 30.0 | Y | 11.39 | 81.6 | 7.6 | 10.8 | 20.9 |
| 28 | 30.0 | 2-Methoxy Ethanol | 30.0 | Y | 11.4 | 81.8 | 8.9 | 9.3 | 18.9 |
| 29 | 25.7 | Cyclohexanol | 30.0 | Y | 11.39 | 81.1 | 8.9 | 10.0 | 19.3 |
| 30 | 30.0 | 1-Propanol | 30.0 | Y | 11.88 | 82.1 | 7.6 | 10.3 | 17.5 |
| 31 | 30.7 | 1-Octanol | 30.0 | Y[b] | 10.32 | 81.6 | 7.8 | 10.6 | 17.7 |
| 32 | 30.3 | Methyl Ethyl Ketone | 30.0 | Y | 9.29 | 81.6 | 7.6 | 10.8 | 20 |
| 33 | 30.1 | Acetone | 30.0 | Y | 9.88 | 82.2 | 7.4 | 10.4 | 20.4 |
| 34 | 29.2 | Ethyl Acetate | 30.0 | Y | 9.09 | 80.4 | 8.4 | 11.2 | 19.2 |
| 35 | 30.1 | Tetrahydrofuran | 30.0 | Y | 9.09 | 81.2 | 8.3 | 10.5 | 19.8 |
| 36 | 27.3 | Toluene | 30.0 | Y | 8.90 | 81.2 | 8.1 | 10.7 | 20.2 |
| 37 | 29.1 | Heptane | 30.0 | Y | 7.38 | 84.2 | 6.5 | 9.3 | 18.1 |
| 38 | 30.8 | Propylene | 67.3 | — | 7.17 | 80.6 | 9.63 | 9.7 | 15.53 |
| 39 | 30.1 | Propane | 60.72 | — | 6.57 | 81.2 | 9.0 | 9.8 | 17.57 |
| 40 | 30.8 | Isobutane | 74.21 | — | 6.92 | 80.6 | 10.7 | 8.7 | 21.50 |

TABLE VII-continued

POLYSILOXANE - COSOLVENT DATA

| Run Number | Wt. Polymer E Charged (g) | Cosolvent | Volume Cosolvent Charged (ml) | Cosolvent Swelling[a] | Cosolvent Solubility Parameter (cal/cc)$^{\frac{1}{2}}$ at 25° C. | Composition of Mixture | | | $CO_2$—Cosolvent-Polymer E Viscosity Ratio |
|---|---|---|---|---|---|---|---|---|---|
| | | | | | | $CO_2$ (wt %) | Cosolvent (wt %) | Polymer (wt %) | |
| 41 | 30.1 | Hydrogen Sulfide | 27.65 | — | 8.44[c] | 80.64 | 9.6 | 9.7 | 18.30 |

[a]See Footnote [a] Table VI.
[b]This took longer than 48 hours to form the one-phase admixture.
[c]See Footnote [k] of Table V.

Referring to Table VII, a variety of cosolvents were found acceptable with Polymer E to result in $CO_2$ viscosity increases of about 10- to 20-fold Methanol, ethylene glycol and acetonitrile (Run Numbers 23-25) were found unacceptable as they did not swell into the polymer to form a one-phase admixture. The experimental procedure for the determination of whether the cosolvent could form a one-phase admixture with the polymer was as follows: about one gram of polymer was added to a glass vial and about 0.1 gram of cosolvent (10% by weight of the polymer) was added at ambient conditions. The mixture was allowed to stand without stirring for at least 48 hours. Visual tests were made periodically to determine if a one-phase admixture resulted (i.e., of the cosolvent swelled into or dissolved into the polymer).

The materials in Runs 38-41 were gaseous at atmospheric pressure and equipment was not available to liquefy the same at ambient temperature, i.e., about 25° C. Nevertheless, each of propylene, propane, isobutane, and $H_2S$ was admixed with $CO_2$ and Polymer E in the amounts shown in Table VII and very significant $CO_2$ viscosity increases were obtained showing that such materials would indeed swell or dissolve into the Polymer E if liquefied.

The results using Polymer I are set forth in Table VIII below.

Referring to Table VIII, Run 42 shows that no increase in viscosity of the $CO_2$ is achieved in the absence of a cosolvent, i.e., the viscosity ratio was 1.0. Runs 43 through 52 illustrate the use of various cosolvents with Polymer I. All of the cosolvents listed in Table VIII were found acceptable for use with Polymer I as they swelled (dissolved) into the polymer at the 10 weight percent level. Viscosity increases of threefold or greater were observed in Runs 46 and 48 through 51. Although Runs 44, 45, and 47 did not result in a viscosity ratio of at least three, they demonstrate that the cosolvents used in these runs are acceptable. The viscosity increases as the amount of polymer increases as seen by a comparison of Runs 47 through 50.

As noted above, the viscosity of any given $CO_2$-polymer-cosolvent system is a direct function of the amount of polymer which is dissolved into the system. For tertiary recovery of oil (or secondary if desired), the viscosity of the $CO_2$ system is desirably from 0.15 centipoises to about 10 centipoises which means that at least a three-fold increase in the viscosity of neat $CO_2$ is desired.

The data in Table IX below illustrate the increase in viscosity of a $CO_2$-toluene-polysiloxane system at 3500 psig and 35° C. as a function of polymer concentration.

TABLE VIII

POLYETHYLVINYLETHER - COSOLVENT DATA

| Run Number | Wt. Polymer I Charged (g) | Cosolvent | Volume Cosolvent Charged (ml) | Cosolvent Swelling[a] | Cosolvent Solubility Parameter (cal/cc)$^{\frac{1}{2}}$ at 25° C. | Composition of Mixture | | | $CO_2$—Colsolvent-Polymer I Viscosity Ratio |
|---|---|---|---|---|---|---|---|---|---|
| | | | | | | $CO_2$ (wt %) | Cosolvent (wt %) | Polymer (wt %) | |
| 42 | 31.8 | None | 0 | — | — | 99.5 | 0 | 0.5 | 1.0 |
| 43 | 30.4 | Methanol | 30.0 | Y | 14.47 | 82.3 | 7.5 | 10.2 | —[b] |
| 44 | 30.1 | Acetonitrile | 30.0 | Y | 11.88 | 81.5 | 7.4 | 11.1 | 1.66 |
| 45 | 30.0 | Ethanol | 30.0 | Y | 12.71 | 83.2 | 7.5 | 9.3 | 1.67 |
| 46 | 55.1 | 1-Butanol | 35.0 | Y | 11.4 | 71.4 | 8.7 | 19.9 | 4.31 |
| 47 | 30.3 | Toluene | 30.0 | Y | 8.90 | 81.5 | 8.1 | 10.4 | 2.04 |
| 48 | 50.3 | Toluene | 30.0 | Y | 8.90 | 77.0 | 8.1 | 14.9 | 3.68 |
| 49 | 60.0 | Toluene | 40.0 | Y | 8.90 | 70.0 | 10.2 | 19.8 | 4.81 |
| 50 | 60.2 | Toluene | 40.0 | Y | 8.90 | 70.4 | 10.2 | 19.4 | 5.04 |
| 51 | 50.2 | Heptane | 51.2 | Y | 7.40 | 71.2 | 10.1 | 18.7 | 3.39 |

[a]See Footnote [a] on Table VI.
[b]Equipment failure but would expect viscosity ratio of about 1.6 since 10.23% polymer dissolved in mixture when compared to Runs 44 and 45.

TABLE IX

EFFECT OF POLYMER CONCENTRATION ON VISCOSITY

| Run Number | Polymer from Table II | Wt. Polymer Charged (g) | Volume Toluene Charged (ml) | Composition of Mixture | | | $CO_2$ Toluene Polymer Viscosity Ratio |
|---|---|---|---|---|---|---|---|
| | | | | $CO_2$ Wt % | Toluene Wt % | Polymer Wt % | |
| 53 | F | 1.43 | 30.0 | 91.34 | 8.18 | 0.48 | 1.30 |
| 54 | F | 3.09 | 30.0 | 90.79 | 8.18 | 1.03 | 1.55 |
| 55 | F | 6.01 | 30.0 | 89.75 | 8.17 | 2.08 | 2.12 |
| 56 | F | 10.1 | 30.0 | 88.13 | 8.16 | 3.71 | 3.04 |
| 57 | F | 15.0 | 30.0 | 85.38 | 8.14 | 5.48 | 5.61 |
| 58 | F | 18.1 | 30.0 | 85.33 | 8.14 | 6.53 | 7.92 |

TABLE IX-continued
EFFECT OF POLYMER CONCENTRATION ON VISCOSITY

| Run Number | Polymer from Table II | Wt. Polymer Charged (g) | Volume Toluene Charged (ml) | Composition of Mixture | | | $CO_2$ Toluene Polymer Viscosity Ratio |
|---|---|---|---|---|---|---|---|
| | | | | $CO_2$ Wt % | Toluene Wt % | Polymer Wt % | |
| 59 | F | 24.1 | 30.0 | 83.41 | 8.12 | 8.47 | 14.16 |
| 60 | F | 27.2 | 30.0 | 82.29 | 8.11 | 9.60 | 18.18 |
| 61 | F | 30.2 | 30.0 | 81.27 | 8.10 | 10.63 | 23.53 |
| 62 | G | 1.70 | 30.0 | 91.18 | 8.18 | 0.63 | 1.47 |
| 63 | G | 3.01 | 30.0 | 90.63 | 8.18 | 1.19 | 1.70 |
| 64 | G | 6.40 | 30.0 | 89.37 | 8.17 | 2.46 | 3.22 |
| 65 | G | 10.50 | 30.0 | 88.03 | 8.16 | 3.82 | 3.95 |
| 66 | G | 15.50 | 30.0 | 85.75 | 8.14 | 6.10 | 9.06 |
| 67 | G | 20.10 | 30.0 | 84.48 | 8.13 | 7.39 | 16.51 |
| 68 | G | 25.3 | 30.0 | 83.12 | 8.12 | 8.77 | 21.34 |
| 69 | G | 30.0 | 30.0 | 81.08 | 8.10 | 10.81 | 34.14 |
| 70 | H | 1.62 | 30.0 | 90.79 | 8.18 | 1.02 | 1.70 |
| 71 | H | 3.17 | 30.0 | 90.56 | 8.18 | 1.26 | 1.95 |
| 72 | H | 6.04 | 30.0 | 89.56 | 8.17 | 2.27 | 3.18 |
| 73 | H | 7.94 | 30.0 | 88.53 | 8.16 | 3.30 | 3.95 |
| 74 | H | 9.71 | 30.0 | 88.25 | 8.18 | 3.60 | 5.19 |
| 75 | H | 14.92 | 30.0 | 86.42 | 8.14 | 5.44 | 10.11 |
| 76 | H | 17.80 | 30.0 | 86.17 | 8.14 | 5.70 | 13.78 |
| 77 | H | 24.41 | 30.0 | 83.08 | 8.12 | 8.80 | 29.48 |

Figure 2:
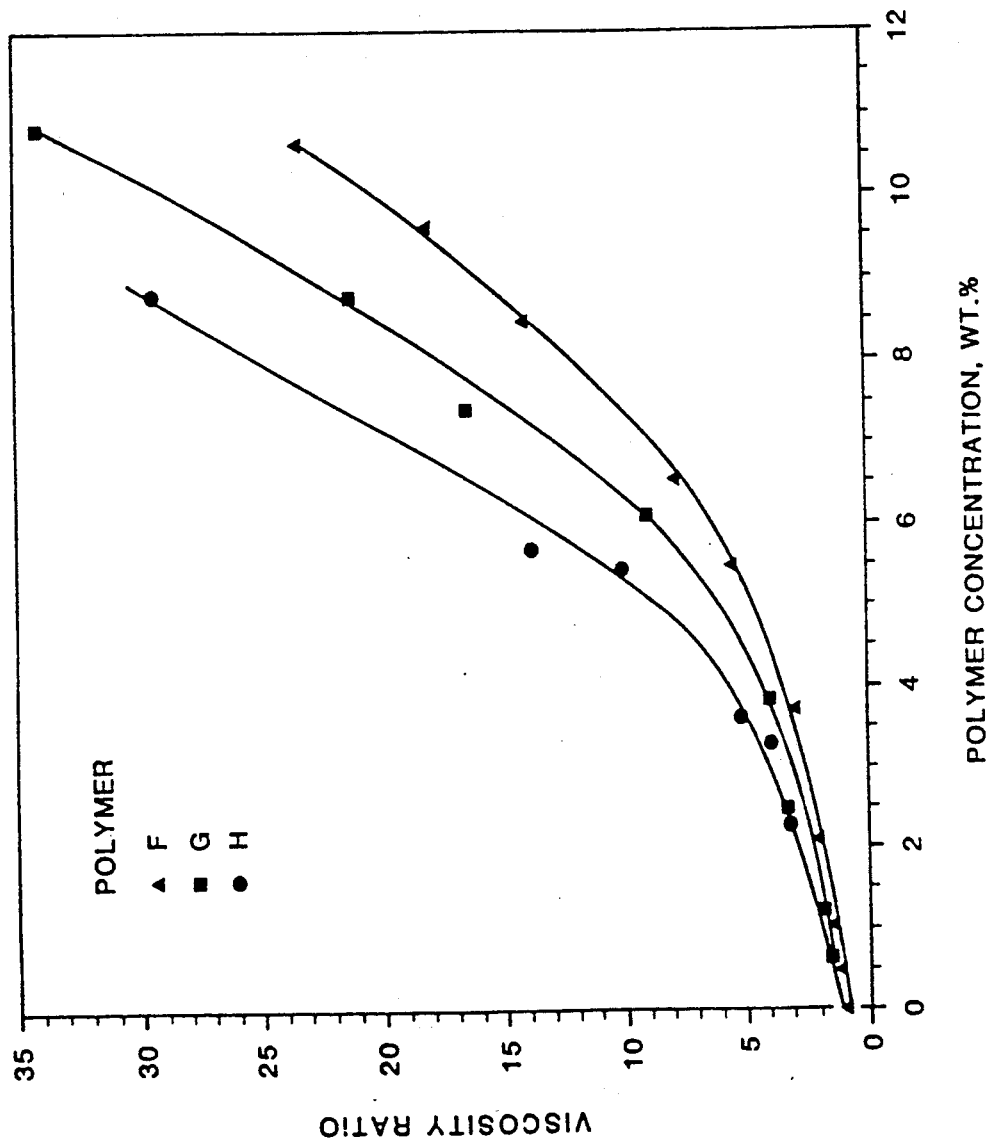
FIG. 2 is a graph showing a plot of $CO_2$-polymer-toluene viscosity vs. polymer concentration.

Referring to Table IX, the viscosity ratio increases as the concentration of dissolved polymer increases for each of the three different viscosity polysiloxanes employed One skilled in the art with a few simple experiments can easily determine the concentration of polymer to employ to achieve any desired increase in viscosity for a given $CO_2$-polysiloxane-toluene system. Similar results would be expected using other polymercosolvent systems. The data from Table IX are shown graphically in FIG. 2.

Figure 3:
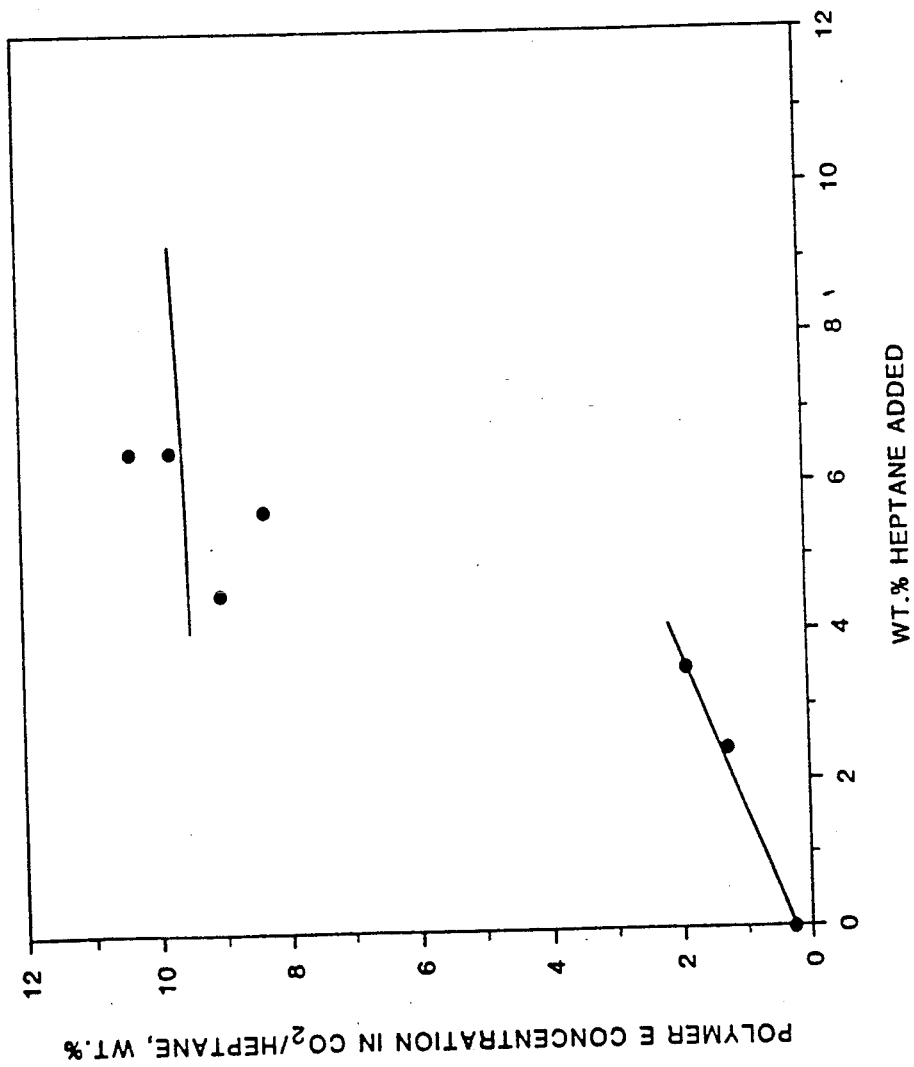
FIG. 3 is a graph showing a plot of polymer concentration vs. wt. % heptane added.

A series of runs was made using polysiloxane Polymer E (from Table II) and either heptane, toluene, or n-butanol as the cosolvent in $CO_2$ at 3500 psig and 35° C. where the concentrations of polymer and cosolvent were varied. The results are shown on FIGS. 3, 4, and 5. Referring to FIG. 3, it is observed that the concentration of Polymer E substantially increases when the heptane concentration is about four weight percent or more. This is interpreted to mean that the plait point of this ternary system is about four weight percent heptane, about nine weight percent polymer and the remainder $CO_2$ at 3500 psig and 35° C. Similar results are apparent for the ternary systems shown in FIGS. 4 and 5 although, of course, the precise plait point compositions are different. By a plait point is meant that concentration of components in a three-component system where a substantially two-phase three-component system changes, sometimes abruptly, to a one-phase three-component system. (See, for example, *Physical Chemistry*, Second Edition, Gilbert W. Castellan, Addison-Wesley Publishing Company (1971) Sections 15-12 and 15-13.)

Figure 4:
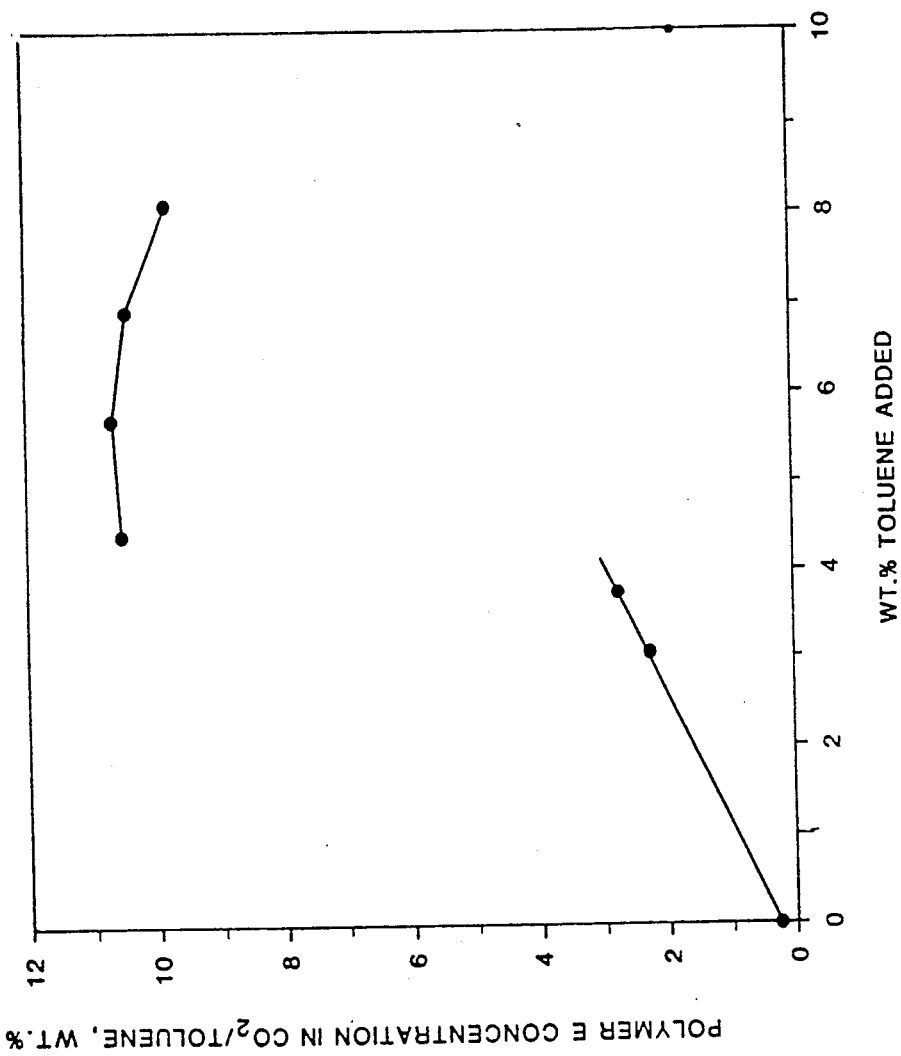
FIG. 4 is a graph showing a plot of polymer concentration vs. wt. % toluene added.
Figure 5:
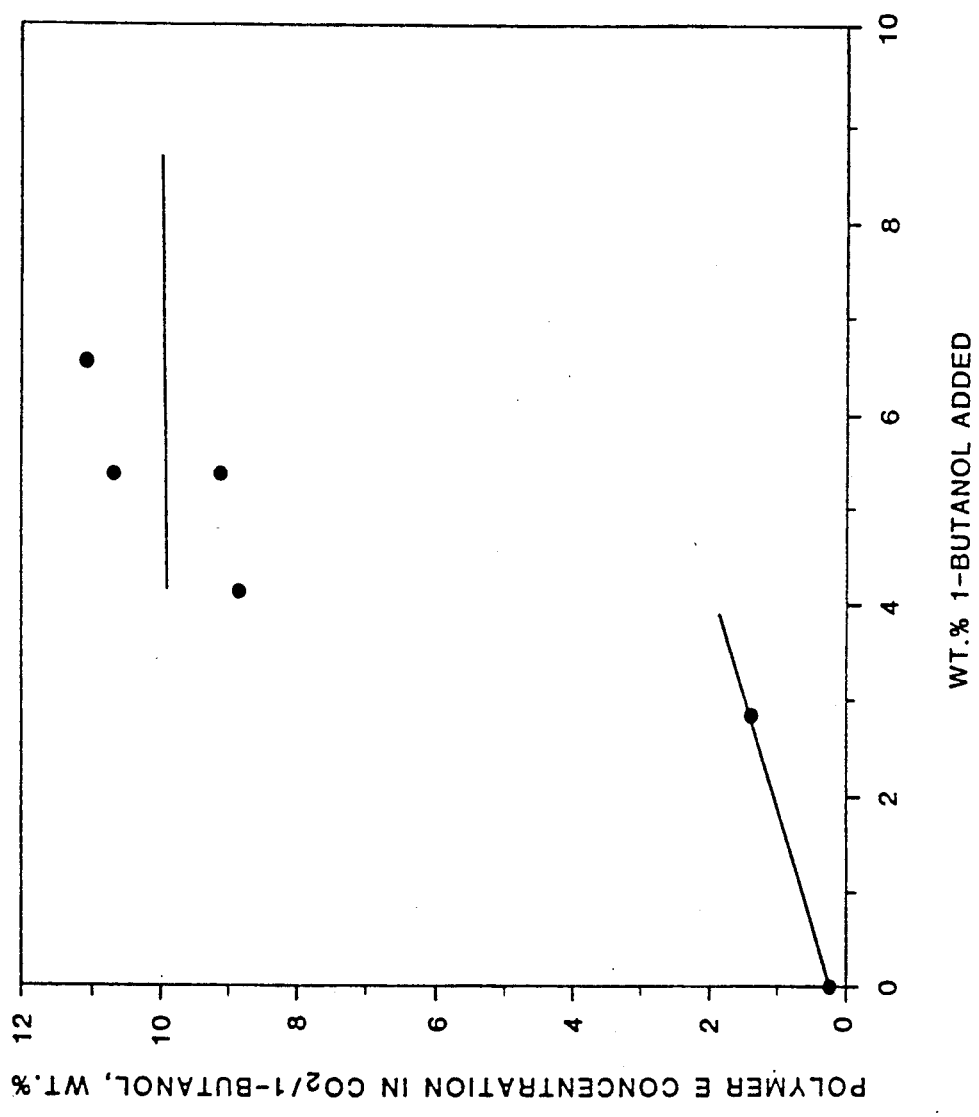
FIG. 5 is a graph showing a plot of polymer concentration vs. wt. % 1-butanol added.

It is clear from FIGS. 3, 4, and 5 that it is necessary to use a sufficient amount of the cosolvent to achieve the plait point concentrations for any given cosolvent-polymer-$CO_2$ system at a fixed temperature and pressure. It is necessary to achieve the plait point concentration in order to achieve a one-phase $CO_2$-polymer-cosolvent system in accordance with this invention. It is observed that the minimum weight ratio of cosolvent to polymer is about 0.4 in order to achieve the desired one-phase system. Of course, higher concentrations of cosolvent can be used and the precise compositions will be dictated by economics. The amount of polymer to use, as noted earlier, is that amount which is sufficient to achieve the desired viscosity in the $CO_2$-polymer-cosolvent system.

Further experimental work was performed in a high-pressure sight-glass apparatus to observe the phase behavior of certain $CO_2$-toluene-polysiloxane compositions under varying conditions of temperature and pressure.

The apparatus and procedures were as follows:

A Jerguson see-through sight glass contained in a constant temperature box and provided with a rocking mechanism for mixing its contents was used for the solubility studies. A light source located behind the sight glass was used to illuminate its contents during visual observation. Pressure in the sight glass was adjusted by the introduction or removal of mercury contained in a hand-driven piston pump. To start a test, the mercury level was lowered in the sight glass to create a vacuum of appropriate volume and this volume next filled with $CO_2$. At specific conditions of temperature and pressure, the volume of $CO_2$ present in the sight glass could be established, and knowing the proper density, the weight of $CO_2$ determined. Appropriate quantities of polymers and cosolvent were introduced into the $CO_2$ phase through appropriate valving using a mechanically operated hand pump.

With all three components present in the sight glass, the temperature of the system was raised to the desired value and the pressure increased by the injection of mercury into the sight glass until the three components would form a clear single-phase solution. The pressure of the system would now be slowly lowered until the minimum pressure for miscibility was reached and this value recorded. The proximity of the miscibility pressure can be established by observing the behavior of the solution as the pressure of the system is lowered. As the system approaches the miscibility condition, the polymer phase separates from the continuous solvent phase in the form of very fine particles which refract light and give the system a yellow coloration. A certain appropriate intensity of coloration was picked as a measure of miscibility. Even though this choice appears arbitrary, it was found that increasing the pressure only 50 psia resulted in a clear solution while decreasing the pressure 50 psia resulted in phase separation.

Figure 6:
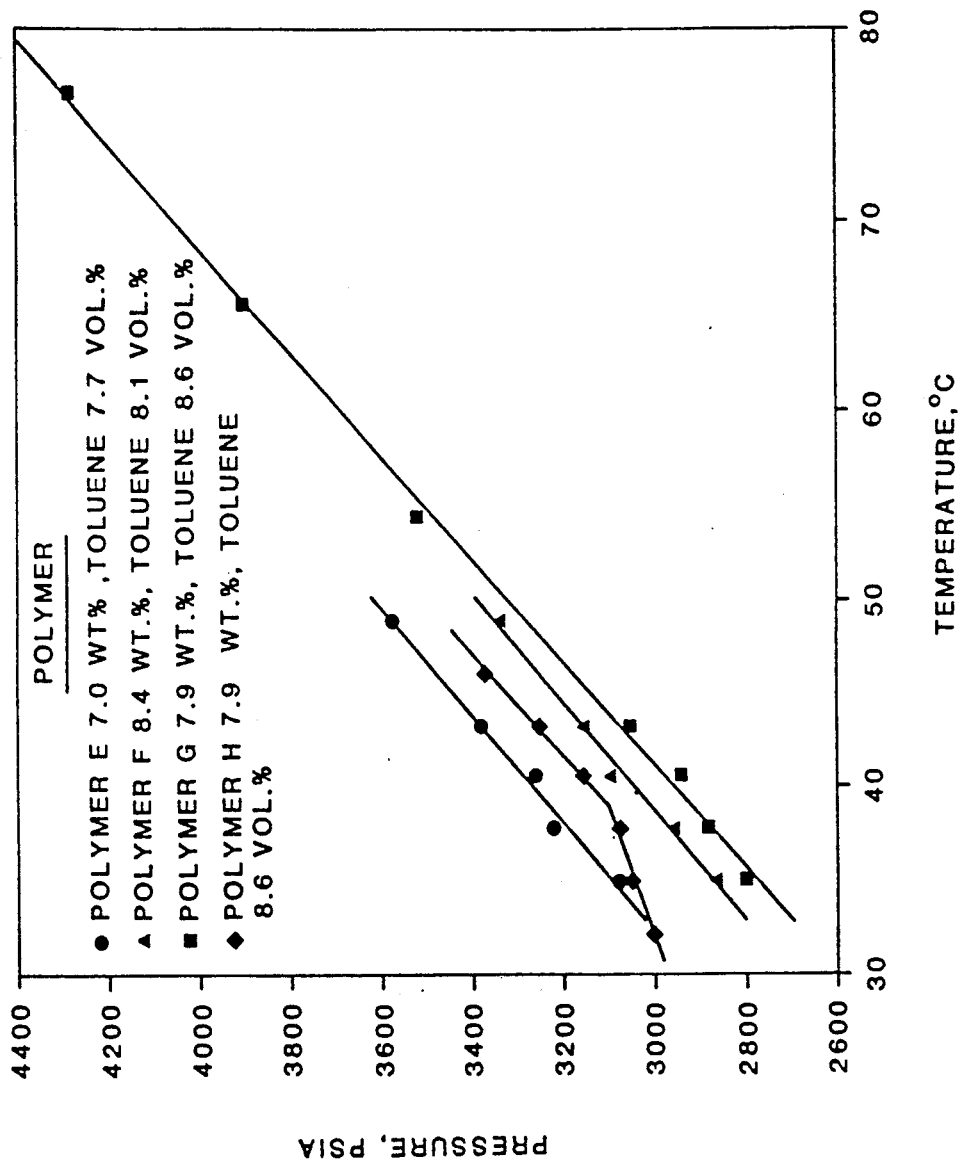
FIG. 6 is a graph showing a plot of $CO_2$-toluene-polymer miscibility pressure vs. temperature.

In a first set of experiments, four different viscosity polysiloxanes (Polymers E, F, G, and H from Table II above) were admixed with toluene and dry $CO_2$ and the mixture introduced into the sight-glass apparatus and the phase behavior studied by varying the temperature and pressure. The amounts of polymer in the mixtures were about 7 to 8 weight percent and the amount of toluene was about 7 to 8 volume percent as noted on FIG. 6 which summarizes the results. Referring to FIG. 6, each line represents the loci of pressures required at a given temperature to achieve a homogeneous solution. Conditions above the miscibility loci lines represent conditions where one-phase behavior was observed for the particular mixture being studied. Conditions below the miscibility loci lines represent conditions where more than one-phase is observed. It was also noted that as the temperature increased, a higher pressure is required to maintain a one-phase solution. It is also unexpected that as the viscosity of the polysiloxane is increased up to 300,000 cSt (Polymers E, F, and G), the pressure requirement to achieve a one-phase solution is decreased. For the 600,000 cSt material (Polymer H), increased pressures are required to achieve a one-phase system. The results of FIG. 6 suggest that one could predict the temperatures and pressures required for a polysiloxane to form a one-phase solution using toluene as the cosolvent for polysiloxanes of any particular kinematic viscosity within the range studied. There are probably a family of curves which could easily be generated by those skilled in the art for each polymer-cosolvent-$CO_2$ system including the amounts of the various components in the mixture.

A next set of experiments was run as above, except the system consisted of six weight percent of a 600,000 cSt polysiloxane (Polymer H from Table II above); varying amounts of toluene; and the remainder $CO_2$. The purpose of the experiments was to determine if a lower pressure could be tolerated to achieve a one-phase system using larger amounts of toluene.

Figure 7:
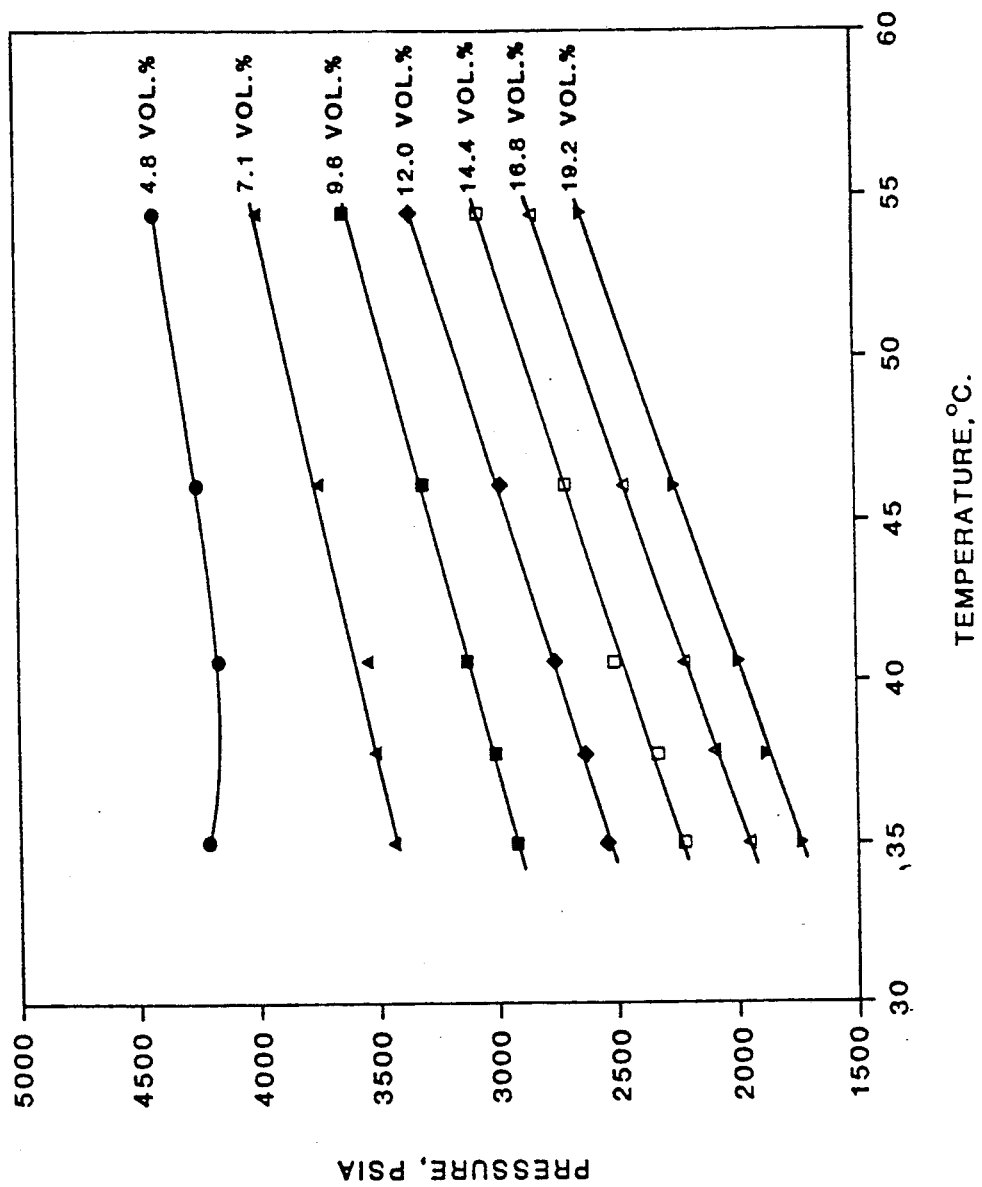
FIG. 7 is a graph showing a plot of the effect of toluene concentration of miscibility pressure of $CO_2$-toluene-polymer H solutions.

The results of this set of experiments are shown on FIG. 7. Referring to FIG. 7, it is observed that the pressure needed to form a miscibility loci line is reduced as the amount of toluene is increased in the mixture, as expected.

From FIGS. 6 and 7, it is observed that the pressure to achieve a one-phase system can be reduced by increasing the cosolvent content or, to a lesser degree, the viscosity of the polymer. Knowing the temperature and pressure of the reservoir, one can reasonably predict from data such as that in FIGS. 6 and 7 the composition of the $CO_2$-cosolvent-polymer mixture that will give the desired one-phase behavior.

Figure 8:
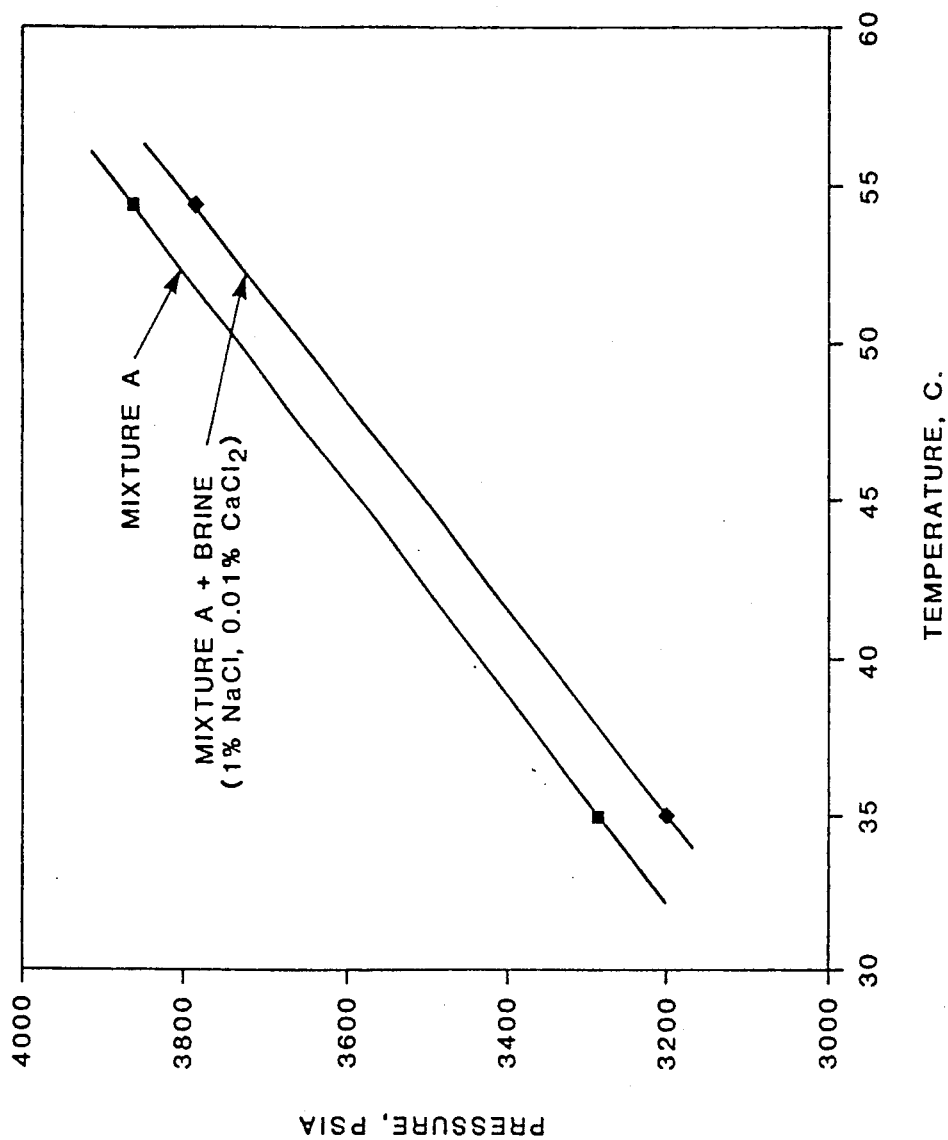
FIG. 8 is a graph showing the effect of brine on miscibility pressure of $CO_2$-toluene-polymer H solution.

Yet another set of experiments was performed to determine the effect on the one-phase system of the presence of brine. By "brine" is meant one weight percent NaCl and 0.01 weight percent $CaCl_2$ in water. The results are shown in FIG. 8. The system studied consisted of 7.9 weight percent of a 600 cSt polysiloxane (Polymer H from Table II above); 8.6 volume percent toluene; with the remainder being $CO_2$, i.e., mixture A on FIG. 8. The results of these experiments are shown on FIG. 8.

Referring to FIG. 8, it was surprising to find that the use of brine-saturated $CO_2$ resulted in a lower pressure miscibility loci line indicating that one-phase operations could be achieved at lower pressures in the presence of brine. The saturation of the $CO_2$ using distilled water resulted in a similar degree of pressure reduction.

It is apparent from the above that the viscosity of $CO_2$ can be increased more than three-fold by adding to the $CO_2$ a viscosifying amount of a polymer so long as a cosolvent is also employed. The new compositions comprising the $CO_2$, polymer and cosolvent can be used, for example, to deposit the polymer as a thin film on a surface, but such compositions are particularly useful for the recovery of oil from an underground oil-bearing formation.

Obviously, many modifications and variations of the invention, as hereinabove set forth, can be made without departing from the spirit and scope thereof, and therefore only such limitations should be imposed as are indicated in the appended claims.

What is claimed is:

1. A solution comprising $CO_2$, a polymer, and a cosolvent; wherein said polymer has a Minimum Solubility Parameter of about 6.85 $(cal/cc)^{\frac{1}{2}}$ or less; wherein in said solution the weight percent of $CO_2$ is at least 70; and the amount of cosolvent is at least sufficient to dissolve said polymer in said $CO_2$.

2. A solution comprising $CO_2$, a polymer, and a cosolvent; wherein, in said solution, the weight percent of $CO_2$ is at least 70; the weight percent of said polymer is at least sufficient to increase the viscosity of said $CO_2$ by a factor of at least 3; and wherein the amount of cosolvent is at least sufficient to dissolve said polymer in said $CO_2$.

3. A solution in accordance with claim 2 wherein the weight ratio of said cosolvent to said polymer is at least 0.4 and wherein said polymer has a Minimum Solubility Parameter of about 6.85 $(cal/cc)^{\frac{1}{2}}$ or less and contains a plurality of a donor atom selected from the class consisting of O, N, and S; and wherein said cosolvent will dissolve at least 2 weight percent $CO_2$ at 25° C. and about 950 psig.

4. A composition in accordance with claim 3 wherein said cosolvent and said polymer form a one-phase mixture at 10 weight percent cosolvent at ambient temperature and a pressure sufficient to maintain the cosolvents in the liquid phase.

5. A composition in accordance with claim 2 wherein said polymer is a liquid polymer and wherein the weight percent of $CO_2$ is from 70 to 99.9; the weight percent of said polymer is from 0.05 to 20; and the weight percent of said cosolvent is from 0.05 to 30.

6. A composition in accordance with claim 5 wherein the polymer has a plurality of donor groups selected from the class consisting of siloxane; carbonyl; tertiary amine; dialkylamides ether; silylether; thioethers; sulfone; and ester.

7. A composition in accordance with claim 6 wherein the polymer is selected from the class consisting of:

(i) a polysiloxane having the formula:

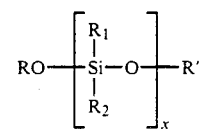

where R and R' can be the same or different and can be hydrogen or any hydrocarbyl having from 1 to 10 carbon atoms;
x can be from 100 to 7,000; and
$R_1$ and $R_2$ can be the same or different and can be selected from the group consisting of:

(a) any hydrocarbyl group having from 1 to 10 carbon atoms; and
(b) a siloxane group; and (ii) a polyvinylether having the formula:

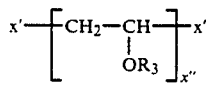

where x' is H, OH, halogen, or

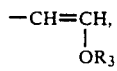

and where x" is from 20 to 3,000 and $R_3$ is a hydrocarbyl group having from 1 to 10 carbon atoms.

8. The composition in accordance with claim 7 wherein the polymer is a polysiloxane having the formula:

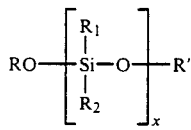

where $R_1$; $R_2$; and R' and x are as defined above.

9. The composition according to claim 8 wherein R, $R_1$, $R_2$, and R' are hydrocarbyl groups having from 1 to 2 carbon atoms and x is from 1,500 to 4,000 and the polymer has a kinematic viscosity of from 40,000 to 8,000,000 cSt at 77° F.

10. The composition according to claim 9 wherein the cosolvent is selected from one or more from the class consisting of alcohols having from 1 to 8 carbon atoms; single ring aromatics having from 6 to 10 carbon atoms; ketones having from 3 to 10 carbon atoms; carboxylic acid where the carboxylic acid ester portion has from 2 to 4 carbon atoms and the ester portion has from 1 to 10 carbon atoms; and hydrocarbons having from 2 to 20 carbon atoms.

11. The solution according to claim 10 wherein the cosolvent has a dielectric constant of less than 30 at 25° C. and a solubility parameter at 25° C. of 7.0 to 12.0 $(cal/cc)^{\frac{1}{2}}$.

12. The solution according to claim 11 wherein the amount of $CO_2$ is from 80 to 99 weight percent; from 0.1 to 10 weight percent of the polysiloxane; and from 0.1 to 15 weight percent of the cosolvent.

13. The solution according to claim 7 wherein the polymer is a polyvinylether having the formula:

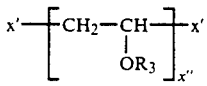

where x' is H, OH, halogen, or

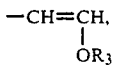

and where x" is from 20 to 3000 and $R_3$ is a hydrocarbyl group having from 1 to 10 carbon atoms.

14. The solution according to claim 13 wherein $R_3$ has from 1 to 2 carbon atoms and x' is from 30 to 500.

15. The solution according to claim 14 wherein the cosolvent is selected from one or more from the class consisting of alcohols having from 1 to 8 carbon atoms; single ring aromatics having from 6 to 10 carbon atoms; ketones having from 3 to 10 carbon atoms; carboxylic acid esters where the carboxylic acid portion has from 2 to 4 carbon atoms and the ester portion has from 1 to 10 carbon atoms; and hydrocarbons having from 2 to 20 carbon atoms.

16. The solution according to claim 15 wherein the amount of $CO_2$ is from 80 to 99 weight percent; from 0.1 to 10 weight percent of the polyvinylether; and from 0.1 to 15 weight percent of the cosolvent.

17. A method of increasing the viscosity of $CO_2$ by at least three-fold which comprises adding to said $CO_2$ (1) a viscosifying amount of a polymer having a Minimum Solubility Parameter of about 6.85 $(cal/cc)^{\frac{1}{2}}$ or less and a plurality of electron donor atoms selected from the class consisting of O, S, and N, and (2) a sufficient amount of a cosolvent to form a one-phase system, said cosolvent being liquid or a compressible gas and capable of (i) dissolving at a concentration of at least 2% by weight in liquid $CO_2$ at 25° C. and about 950 psig and (ii) forming a one-phase mixture with the polymer at ambient temperature and a pressure sufficient to maintain the cosolvent in the liquid phase when said mixture contains 10 weight percent of said cosolvent.

18. The method according to claim 17 wherein the polymer is a liquid polymer selected from the class consisting of:

(i) a polysiloxane having the formula:

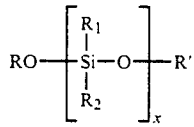

where R and R' can be the same or different and can be hydrogen or any hydrocarbyl having from 1 to carbon atoms;
x can be from 100 to 7,000; and
$R_1$ and $R_2$ can be the same or different and can be selected from the group consisting of:
(a) any hydrocarbyl group having from 1 to 10 carbon atoms; and
(b) a siloxane group; and (ii) a polyvinylether having the formula:

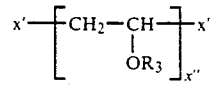

where x' is H, OH, halogen, or
and
where x" is from 20 to 3,000 and $R_3$ is a hydrocarbyl group having from 1 to 10 carbon atoms and wherein the cosolvent is selected from one or more from the class consisting of alcohols having from 1 to 8 carbon atoms; single ring aromatics having from 6 to 10 carbon atoms; ketones having from 3 to 10 carbon atoms; carboxylic acid esters where the carboxylic acid portion has from 2 to 4 carbon atoms and the ester portion has from 1 to 10 carbon atoms; and hydrocarbons having from 2 to 20 carbon atoms.

19. The method according to claim 18 wherein the polymer is a polysiloxane having the formula:

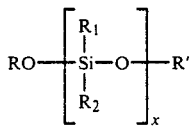

where R, $R_1$, $R_2$, and R' are hydrocarbyl groups having from 1 to 2 carbon atoms and x is from 1,500 to 4,000 and the polymer has a kinematic viscosity of 40,000 cSt to 8,000,000 cSt at 77° F. and the cosolvent has a dielectric constant of less than 30 at 25° C. and a solubility parameter at 25° C. of 7.0 to 12.0 (cal/cc)$^{\frac{1}{2}}$.

20. The method according to claim 18 wherein the polymer is a polyvinyl ether having the formula:

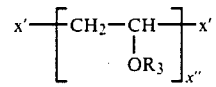

where x' is H, OH, halogen, or

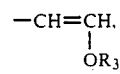

and where x'' is from 20 to 3000 and $R_3$ is a hydrocarbyl group having from 1 to 10 carbon atoms.

* * * * *